( 12 ) United States Patent
Barr et al.

(10) Patent No.: US 9,177,200 B2
(45) Date of Patent: *Nov. 3, 2015

(54) OBJECT CLASSIFICATION

(75) Inventors: Jordi McGregor Barr, Bristol (GB);
Christopher Mark Lloyd, Bristol (GB);
Mark Lawrence Williams, Bristol
(GB); David Nicholson, Bristol (GB)

(73) Assignee: BAE SYSTEMS PLC, London (GB)

( * ) Notice: Subject to any disclaimer, the term of this patent is extended or adjusted under 35 U.S.C. 154(b) by 375 days.

This patent is subject to a terminal disclaimer.

(21) Appl. No.: 13/319,926

(22) PCT Filed: May 13, 2010

(86) PCT No.: PCT/GB2010/050781
§ 371 (c)(1),
(2), (4) Date: Nov. 10, 2011

(87) PCT Pub. No.: WO2010/131043
PCT Pub. Date: Nov. 18, 2010

(65) Prior Publication Data
US 2012/0053914 A1 Mar. 1, 2012

(30) Foreign Application Priority Data

May 14, 2009 (EP) ..................................... 09275035
May 14, 2009 (GB) ..................................... 0908271.0

(51) Int. Cl.
*G06F 17/10* (2006.01)
*G06K 9/00* (2006.01)
(Continued)

(52) U.S. Cl.
CPC ............. *G06K 9/00496* (2013.01); *G01S 7/539* (2013.01); *G01S 15/88* (2013.01); *G06K 9/6268* (2013.01)

(58) Field of Classification Search
None
See application file for complete search history.

(56) References Cited

U.S. PATENT DOCUMENTS 7,320,000 B2 * 1/2008 Chitrapura et al. ............... 707/7
7,362,892 B2 4/2008 Lewis et al.
(Continued)

FOREIGN PATENT DOCUMENTS

JP 11-52046 A 2/1999

OTHER PUBLICATIONS

Pontoppidan, "Condition Monitoring and Management from Acoustic Emissions", Thesis, The Technical University of Denmark, 2005, 219 pages.*

(Continued)

*Primary Examiner* — Omar Fernandez Rivas
*Assistant Examiner* — Herng-Der Day
(74) *Attorney, Agent, or Firm* — Maine Cernota & Rardin

(57) ABSTRACT

A method and apparatus for selecting a value or change in value of a measurement variable for an observation of an object, comprising: receiving models for the object defined in terms of an observation parameter and a measurement variable; selecting values of the measurement variable; for each model, determining a value of the observation parameter for each selected value; for each selected value, determining a value of an expected classification potential level using the determined values; and selecting a value of the measurement variable dependent upon the potential level values; wherein the potential level is an expected level of: the information or lack of information, and/or the certainty or uncertainty, with which the object could be classified if a measurement of the observation parameter were taken of the object at the respective value of the measurement variable.

12 Claims, 17 Drawing Sheets

(51) Int. Cl.
 *G01S 7/539* (2006.01)
 *G01S 15/88* (2006.01)
 *G06K 9/62* (2006.01)

(56) References Cited

U.S. PATENT DOCUMENTS

| | | | |
|---|---|---|---|
| 7,916,933 B2* | 3/2011 | Schwartz et al. | 382/154 |
| 8,311,960 B1 | 11/2012 | Ginzburg et al. | |
| 2004/0096107 A1 | 5/2004 | Ii et al. | |
| 2005/0100209 A1 | 5/2005 | Lewis et al. | |
| 2006/0052923 A1 | 3/2006 | Farmer et al. | |
| 2012/0000349 A1 | 1/2012 | Couronneau et al. | |
| 2012/0059829 A1* | 3/2012 | Barr et al. | 707/748 |

OTHER PUBLICATIONS

International Search Report (PCT/ISA/210) issued on Aug. 25, 2010, by Great Britain Patent Office as the International Searching Authority for International Application No. PCT/GB2010/050782.
Written Opinion (PCT/ISA/237) issued on Aug. 25, 2010, by Great Britain Patent Office as the International Searching Authority for International Application No. PCT/GB2010/050782.
European Search Report issued on Nov. 13, 2009.
Great Britain Search Report issued on Sep. 11, 2009.
International Search Report (PCT/ISA/210) issued on Sep. 20, 2010, by Great Britain Patent Office as the International Searching Authority for International Application No. PCT/GB2010/050781.
Written Opinion (PCT/ISA/237) issued on Sep. 20, 2010, by Great Britain Patent Office as the International Searching Authority for International Application No. PCT/GB2010/050781.
European Search Report issued on Nov. 3, 2009.
Great Britain Search Report issued on Sep. 14, 2009.
Hojen-Sorensen Padfr et al., "On-line probabilistic classification with particle filters", Neural Networks for Signal Processing, Sydney, NSW, Australia, vol. 1, Dec. 11, 2000, pp. 386-395, SP002552326.
William Ng et al., "On particle filters for landmine detecting using impulse ground penetrating radar", Sensor Array and Multichannel signal Processing workshop, Jul. 21, 2008, pp. 225-228, XP031312322.
Li Tang et al., "Ground bounce tracking for landmine detection using a sequential Monte Carlo method", Proc. Spie, signal Processing II, vol. 6553, Apr. 9, 2007, XP002554558.
Bugallo M F et al., "Particle Filtering", IEEE Signal Processing Magazine, IEEE Service Center, Piscataway, NJ, US, Sep. 1, 2003, pp. 19-38, XP011102070.
Berry P E et al., "Optimal employment of space surveillance resources for maritime target tracking and re-acquisition", Information Fusion, Proceedings of the Sixth International confe rence of Jul. 8-11, 2003, Piscataway, NJ, USA, vol. 1, Jul. 8, 2003, pp. 719-725, XP010676510.
Rigby P et al., "Adaptive Sensing for Localisation of an Autonomous Underwater Vehicle", Australasian Conference on Robotics and Automation, Dec. 5, 2005, pp. 1-7, XP002552327.
Rainer Kümmerle et al., "Active Monte Carlo Localization in Outdoor Terrains using Multi-Level Surface Maps", Informatik Aktuell, Autonome Mobile Systeme, Oct. 18-19, 2007, pp. 29-35, XP002554559.
A. Doucat et al., "Sequential Monte Carlo Methods in Practice", Dec. 31, 2011, pp. 1-94, XP002591549.
Yap T N et al., "Slam in large indoor environments with low-cost, noisy, and sparse sonars", Robotics and Automation, 2009, Piscataway, NJ, USA, May 12, 2009, pp. 1395-1401, XP031509426.
Notification Concerning Transmittal of International Preliminary Report on Patentability (Forms PCT/IB/326 and PCT/IB/373) and the Written Opinion of the Searching Authority ( Form PCT/ISA/237) issued in the corresponding International Application No. PCT/GB2010/050781 dated May 13, 2010.
C.E. Shannon, "A Mathematical Theory of Communication", The Bell System Technical Journal, (1948), vol. 27, pp. 379-423, 623-656.
M.S. Arulampalam et al., "A Tutorial on Particle Filters for Online Nonlinear/Non-Gaussian Bayesian Tracking", IEEE Transactions on Signal Processing, (2002), vol. 50, Issue 2, pp. 174-188.

* cited by examiner

OBJECT CLASSIFICATION

FIELD OF THE INVENTION

The present invention relates to selecting a value or change in value of a measurement variable (40) to be used for an observation of an object to be classified.

BACKGROUND

The problems of detection and classification arise in many fields. A detection problem is, for example, one of detecting a target object in a certain environment. A classification problem is, for example, one of determining to which class or group of objects the detected target object belongs. An example field in which detection and classification problems arise is the field of mine counter measures (MCM). In the field of mine counter measures, the classification of a detected object is required to be performed in order to identify the detected object as a mine, and ideally a particular type of mine.

Current mine counter measures rely on an operator interpreting signals, for example from Sonar and/or an electro-optics sensor, to identify a target as a mine and classify the detected mine accordingly. This is a difficult task that requires a skilled operator and sufficiently clear conditions.

Current mine counter measures sometimes use mine detection/classification decision aids. These decision aids are based on Automatic Target Recognition (ATR) of a single view or measurement of a target. However, there is a large amount of uncertainty as to the target under observation. Mine detection and classification is currently inefficient, and tends not to be feasible in any but the most benign environments, using a single measurement or observation of a particular facet of a target.

Other mine-classifiers based on analytical models, or state-transition matrices often fail because targets are typically not well represented by simple analytical, or piecewise stationary models.

Quite separate from the field of object classification, particle filters are known. Particle filters are a type of Monte Carlo based recursive estimator. Particle filters are typically used to estimate the state of a system, that is changing in time, at a particular point in time, e.g. at a future time. A future state of a dynamic and noisy system is estimated using present observations of the system.

SUMMARY OF THE INVENTION

In a first aspect the present invention provides a method of selecting a value or change in value of a measurement variable to be used for an observation of an object to be classified, the method comprising: receiving a plurality of models for the object defined in terms of an observation parameter as a function of the measurement variable; selecting a plurality of values of the measurement variable or change in the measurement variable; for each model, determining a respective corresponding value of the observation parameter for each of the selected values of the measurement variable/changes in the measurement variable; for each selected value of the measurement variable/change in the measurement variable, determining a value of a function using the determined values of the observation parameter corresponding to each of the models, wherein the function provides that each determined value of the function is indicative of an expected classification potential level; and selecting a value or change in value of a measurement variable for an observation of the object to be classified dependent upon the determined classification potential level values; wherein the classification potential level is a relative expected level of: (i) the information or lack of information, for use in a process leading toward classification of the object as one of the models, that is to be obtained if a measurement of the observation parameter were taken of the object at a respective value of the measurement variable; and/or (ii) the certainty or uncertainty with which the object could be classified as one of the models if a measurement of the observation parameter were taken of the object at the respective value of the measurement variable.

The method may further comprise receiving respective classification probabilities that each respective model corresponds to the object; and wherein determining the value of the function further comprises using the received respective classification probabilities.

The classification potential level may be an expected entropy value.

The expected entropy value may be an expected Shannon entropy value.

The value or change in value of a measurement variable for an observation of an object to be classified that is selected dependent upon the determined classification potential level values may correspond to a minimum or a maximum classification potential level value.

The method may further comprise measuring a value of the observation parameter of the object to be classified at the selected value/change in value of the measurement variable.

The measurement variable may be an angle from which the object to be classified is observed.

The method may further comprise using a classifier in which an observation of the object to be classified is performed at the selected value/change in value of the measurement variable and in which the resulting observed observation parameter value is used in a process of providing respective classification probabilities that each respective model corresponds to the object.

The method may further comprise using the provided respective classification probabilities in at least one further iteration of a method according to any of the above aspects in which determining the value of the function further comprises using the provided respective classification probabilities.

The classifier may comprise a particle filter used to weight particles on the plurality of models for the object.

The classification potential level may be calculated using the following formula:

$$g_{t+1}(\Delta\theta_{t+1}) = E_{O_{t+1}|O_t,\Delta\theta_t,\Delta\theta_{t+1}}(H(R_l | \Delta\theta_t, \Delta\theta_{t+1}, O_t, O_{t+1}))$$

$$= \sum_{l=1}^{L} H(R_l | \Delta\theta_t, \Delta\theta_{t+1}, O_t, O_{t+1}) \times$$

$$\frac{\sum_{l=1}^{L} P(O_t, O_{t+1} | \Delta\theta_t, \Delta\theta_{t+1}, R_l)}{\sum_{l=1}^{L} P(O_t | \Delta\theta_t, R_l)}$$

where: $g_{t+1}$ is the expected entropy at the time-step t+1;
E(X) denotes the expected value of X;
H(X) is entropy of the variable X,
$R_l$ is a model of type l=1, 2, ..., L;
P(X) is the probability of the variable X;
$\theta$ is a measurement variable;
$\Delta\theta_t$ is the total change in value of the measurement variable $\theta$ in all previous time steps t=0,1, ..., t;

$O_{t+1}$ is the predicted measured value of the observation parameter at the time steps t+1; and $O_t$ is the set of previously measured values of the observation parameter at the time steps t=0,1, ..., t The selected value or change in value of a measurement variable for an observation of an object to be classified dependent upon the determined classification potential level values may be determined using the following formula:

$$\Delta\theta_{opt} = \operatorname*{argmax}_{\Delta\theta}(H(R_l \mid \Delta\theta_t, O_t) - g_{t+1})$$

where: $\Delta\theta_{opt}$ is the selected value or change in value of a measurement variable for an observation of an object to be classified;

$g_{t+1}$ is the expected entropy at the time-step t+1;

H(X) is entropy of the variable X;

$R_l$ is a model of type l=1, 2, ..., L;

θ is the measurement variable $\Delta\theta_t$ is the total change in value of the measurement variable θ in all previous time steps t=0, 1, ..., t; and $O_t$ is the set of previously measured values of the observation parameter at the time steps t=0, 1, ..., t.

In a further aspect the present invention provides a computer program or plurality of computer programs arranged such that when executed by a computer system it/they cause the computer system to operate in accordance with a method according to any of the above aspects.

In a further aspect the present invention provides a machine readable storage medium storing a computer program or at least one of the plurality of computer programs according to the above aspect.

In a further aspect the present invention provides an apparatus comprising means arranged to perform a method of determining selection criteria of a measurement variable according to any of the above aspects.

DETAILED DESCRIPTION

Figure 1:
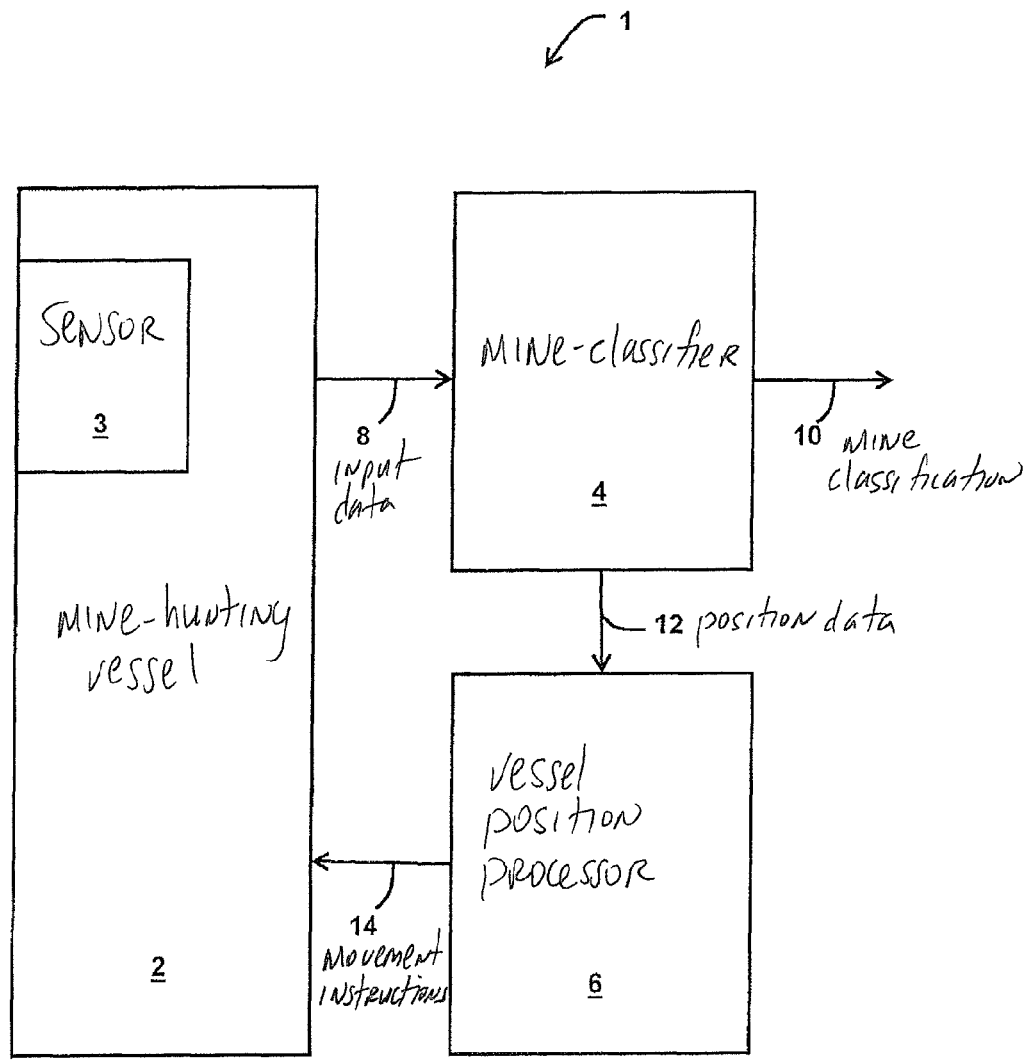
FIG. 1 is a schematic illustration of a mine detection and classification system.

FIG. 1 is a schematic illustration of a mine detection and classification system 1. The mine detection and classification system 1 comprises a mine-hunting vessel 2, a mine-classifier 4, and a vessel position processor 6.

The mine-hunting vessel 2 is an Autonomous Underwater Vehicle (AUV). The mine-hunting vessel 2 comprises a sensor 3. The sensor 3 is forward-looking sonar. The sensor 3 makes observations of a target (not shown), for example the sensor 3 measures a physical quantity of the target, and converts the observations into a signal, hereinafter referred to as "input data 8", in a conventional way. In this embodiment, the target for the mine-hunting vessel 2 is identified by a target identifying vessel (not shown). In this example, the input data 8 comprises data representative of the observation of the target and data representative of the angle of the target relative to the mine-hunting vessel 2, i.e. the three dimensional bearing of the target from the mine-hunting vessel, this angle may be specified in terms of azimuth and elevation. The mine hunting vessel 2 comprises an output that is coupled to an input of the mine-classifier 4 enabling, for example, the input data 8 to be sent from the mine-hunting vessel 2 to the mine classifier 4. The input data 8 is output from the mine hunting vessel 2. The input data 8 is sent to the mine-classifier 4. The mine-hunting vessel comprises an input that is coupled to an output of the vessel position processor 6 enabling, for example, movement instructions 14 to be received at the mine-hunting vessel 2 from the vessel position processor 6. The mine-hunting vessel 2 receives movement instructions 14 from the vessel position processor 6. The movement instructions are described in more detail later below in the description of the vessel position processor 6.

The mine-classifier 4 comprises an input that is coupled to the output of the mine-hunting vessel 2 enabling, for example, input data 8 to be received at the mine-classifier 4 from the mine-hunting vessel 2. The mine-classifier 4 is described in greater detail later below with reference to FIG. 2. The mine classifier 4 comprises a first output enabling, for example, the output of a mine-classification 10 from the mine-classifier. In operation, the mine-classifier 4 outputs a mine classification 10 which can, for example, be read by a user (not shown) of the mine detection and classification system 1. Also, the mine-classifier 4 comprises a second output. The second output is coupled to an input of the vessel position processor 6 enabling, for example, a signal, hereinafter referred to as "position data 12", to be sent from the mine-classifier 4 to the vessel position processor 6. In operation, the position data 12 is sent from the mine-classifier 4 to the vessel position processor 6. In this example, the position data 12 comprises data representative of the observation of the target and data representative of the angle of the target relative to the mine-hunting vessel 2. In this example, the position data 12 also comprises information on possible mine-models and relative probabilities associated with the target. In operation, the position data 12 is sent to the vessel position processor 6.

The vessel position processor 6 comprises an input that is coupled to the second output of the mine-classifier 4 enabling, for example, the position data 12 to be received at the vessel position processor 6 from the mine-classifier 4. In operation, the vessel position processor 6 performs an entropy minimisation algorithm on the position data 12. The entropy minimisation algorithm will be described in greater detail later below with reference to FIGS. 7 to 9. The entropy minimisation algorithm performed on the position data 12 determines a best angle from which the mine-hunting vessel 2 should observe the target. The vessel position processor 6 generates movement instructions 14 which are sent to the mine-hunting vessel 2. The vessel position processor 6 comprises an output that is coupled to the input of the mine-hunting vessel 2 enabling, for example, the movement instructions 14 to be sent from the vessel position processor 6 to the mine-hunting vessel 2. In this example, the movement instructions 14 comprise instructions that enable the mine-hunting vessel 2 to position itself such that the target can be observed from the best angle determined by the entropy minimisation algorithm.

Apparatus, including the mine-classifier 4 and the vessel position processor 6, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Figure 2:
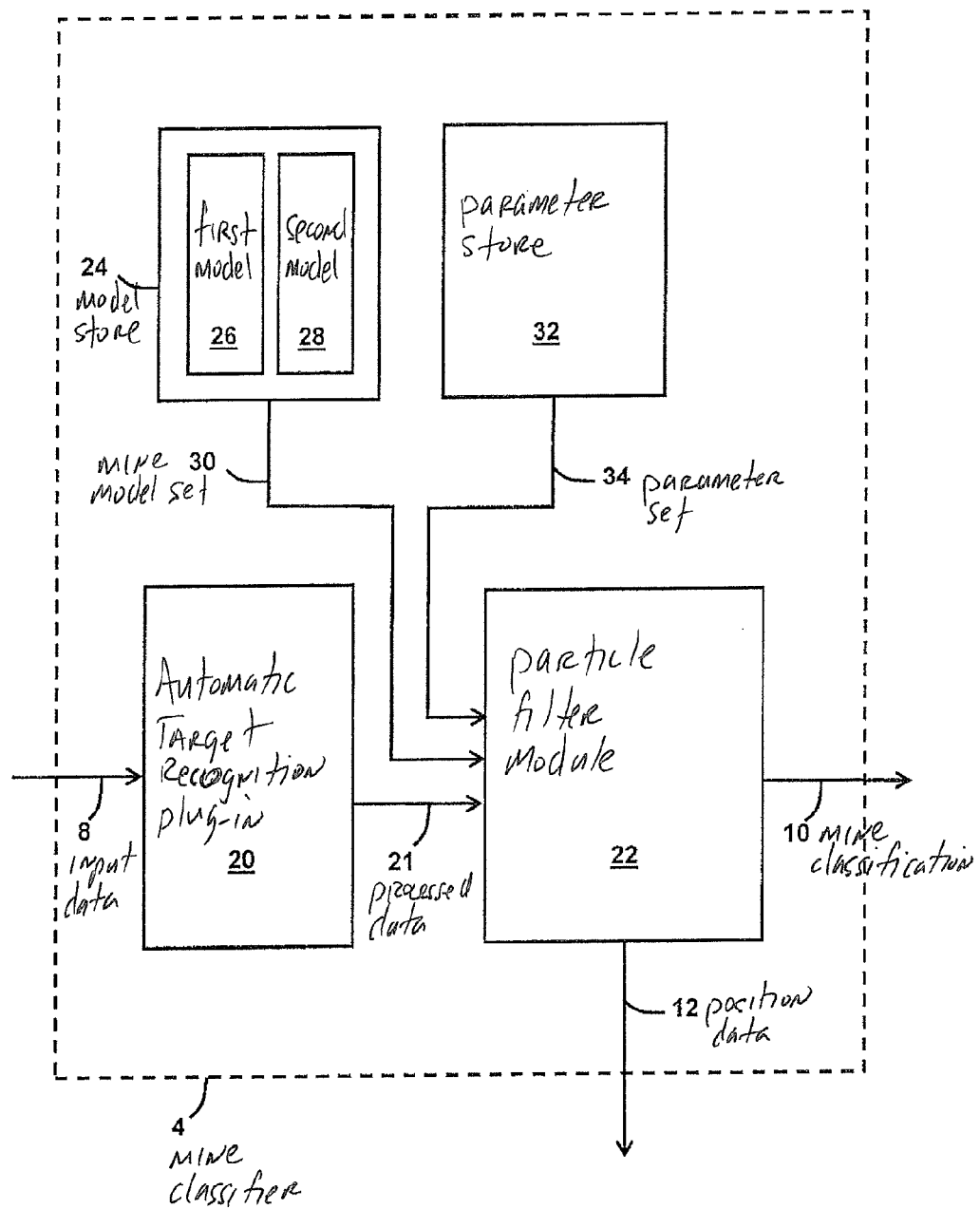
FIG. 2 is a schematic illustration showing details of a mine-classifier.

FIG. 2 is a schematic illustration showing further details of the mine-classifier 4. In this example, the mine-classifier 4 comprises an Automatic Target Recognition plug-in 20, a particle filter module 22, a mine model store 24, and a parameter store 32.

The Automatic Target Recognition plug-in 20 comprises an input that is coupled to the output of the mine-hunting vessel 2 enabling the input data 8 to be received at the Automatic Target Recognition plug-in 20 from the mine-hunting vessel 2. In operation, the Automatic Target Recognition plug-in 20 processes the input data 8. In this example, the Automatic Target Recognition plug-in 20 ensures that the input data 8 is in the same format as the trained templates that are stored in the trained template store, which are described in greater detail further below, i.e. the Automatic Target Recognition plug-in 20 renders the input data 8 informative. The input data processed by the Automatic Target Recognition plug-in 20, hereinafter referred to as "processed data 21", is output from the Automatic Target Recognition plug-in 20. The Automatic Target Recognition plug-in 20 comprises an output that is coupled to a first input of the particle filter module 22 enabling the processed data 21 to be sent from the Automatic Target Recognition plug-in 20 to the particle filter module 22.

The mine model store 24 comprises models of targets of interest. The models of targets of interest will be described in greater detail later below with reference to FIGS. 3 and 4. In this example, the mine model store 24 comprises a first model of a target of interest, i.e. a model of a first type of mine, referred to hereinafter as the "first model 26", and a second model of a different target of interest, i.e. a model of a second type of mine, referred to hereinafter as the "second model 28". The first model 26 and the second model 28 make up a mine model set 30. The mine model store 24 comprises an output that is coupled to a second input of the particle filter module 22 enabling the mine model set 30 to be sent from the mine model store 24 to the particle filter module 22. In this embodiment, the first mine model 26 and the second mine model 28 are made empirically, for example, by taking sonar sensor measurements of a replica mine of a first and second type respectively.

Data for a model is, preferably, gathered under controlled conditions, for example, in a laboratory or in field trials. This data is used to establish a model of a known response which can be interrogated during a subsequent filtering process (see below). Alternatively, comprehensive data for the model may be generated by simulating the target objects and/or sensor measurements thereof.

Each model is, preferably, built from a large number of measurements taken over a range of angles to establish a comprehensive representation of the mine. These measurements are then used to determine an average return (e.g. sonar return) v angle together with associated uncertainty for the respective mine. Each average return response represents the corresponding model.

By using empirical or simulated data to generate each model, a comprehensive model set 30 can be established that represents an intricate level of detail which may be absent in a corresponding model set derived by a mathematically analytical approach. Consequently, the classification is more robust as the model is a real representation of the target to be identified.

The parameter store 32 stores at least one physically-motivated parameter that is used by the particle filter module 22 to classify the target. For example, the parameter store 32 stores one or more particle distribution parameters, model transition probabilities, prior target probabilities, prior angle probabilities, initial particle locations, initial particle weights, model transition matrices, or a combination of any of the aforementioned parameters or others. The parameters stored in the parameter store are described in more detail later below with reference to FIGS. 3 and 4. The parameter store sends a set of any number of the above mentioned parameters or others, hereinafter referred to as the "parameter set 34", to the particle filter module 22. The parameter store 32 comprises an output that is coupled to a third input of the particle filter module 22 enabling the parameter set 34 to be sent from the parameter store 32 to the particle filter module 22.

The particle filter module 22 comprises a first input, a second input and a third input. The first input is coupled to the output of the Automatic Target Recognition plug-in 20 enabling the processed data 21 to be received at the particle filter module 22 from the Automatic Target Recognition plug-in 20. The second input is coupled to the output of the mine model store 24 enabling the mine model set 30 to be received at the particle filter module 22 from the mine model store 24. The third input is coupled to the output of the parameter store 32 enabling the parameter set 34 to be received at the particle filter module 22 from the parameter store 32. In operation, the particle filter module 22 receives the processed data 21, the mine model set 30 and the parameter set 34. In this example, the particle filter module 22 uses the mine model set 30 and the parameter set 34 to perform a mine-classification process on the processed data 21. The mine-classification process is described in greater detail later below with reference to FIGS. 3 and 4. The particle filter module 22 comprises a first output enabling, for example the output of a mine-classification 10 from the particle filter module 22. An output of the mine-classification process is the mine classification 10 which can, for example, be sent to and read by a user (not shown) of the mine detection and classification system 1. The particle filter module 22 comprises a second output. The second output is coupled to an input of the vessel position processor 6 enabling, for example, the position data 12 to be sent from the particle filter module 22 to the vessel position processor 6. In this example, the position data 12 is sent to the vessel position processor 6 as described above with reference to FIG. 1.

The above described particle filter module 22 may be implemented in any suitable manner. The module may consist of a single discrete entity added to a conventional mine-classifier apparatus, or may alternatively be formed by adapting existing parts of a conventional mine-classifier apparatus, for example by reprogramming of a one or more processors therein. As such the particle filter module 22 may be implemented in the form of a computer program or plurality of computer programs stored in or on a machine readable storage medium such as computer memory, a computer disk, ROM, PROM etc., or any combination of these or other storage media. Furthermore, whether a separate entity or an adaptation of existing parts or a combination of these, the module may be implemented in the form of hardware, firmware, software, or any combination of these.

Figure 3:
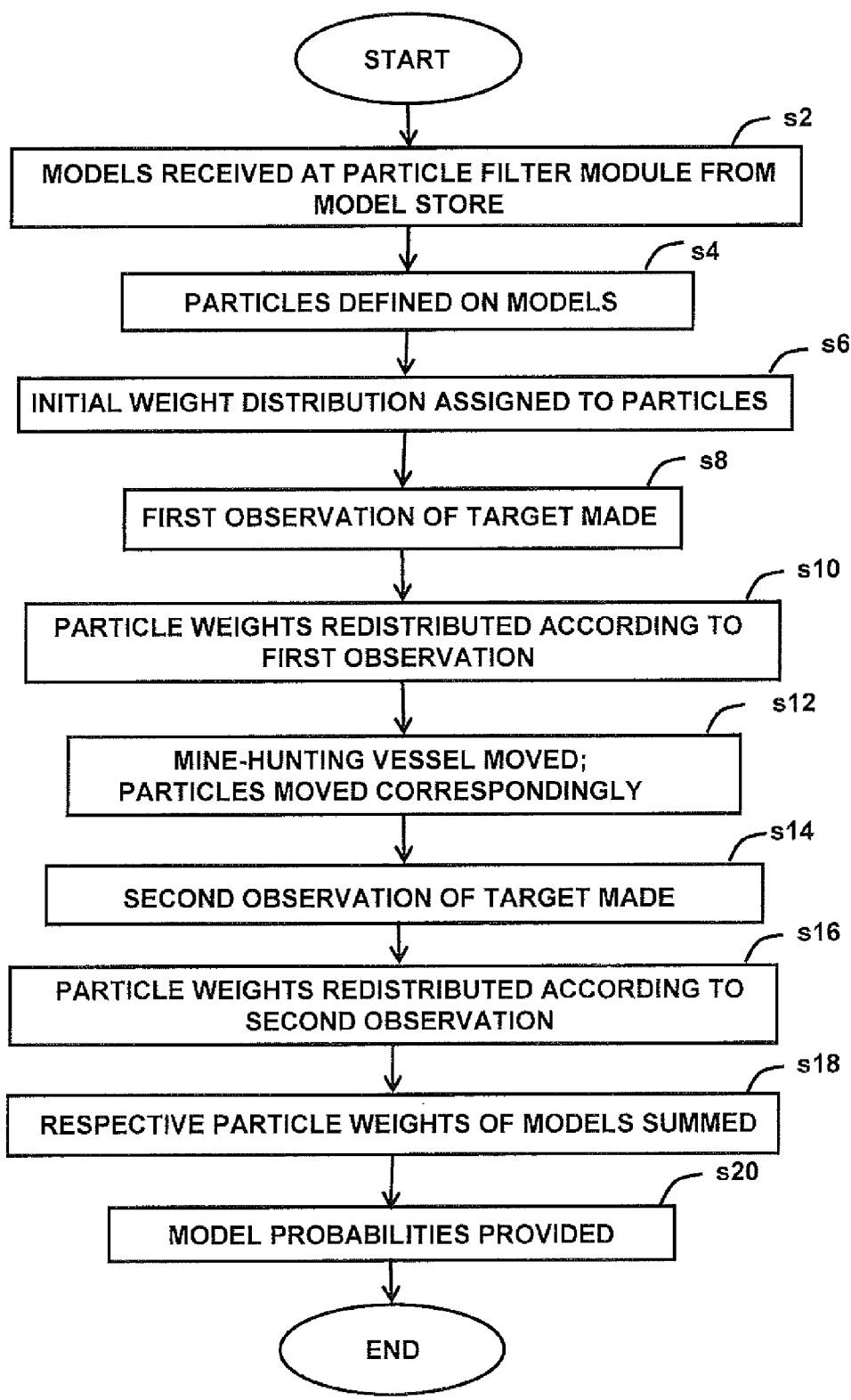
FIG. 3 is a process flow chart showing certain steps of an example of a mine-classification process performed by the mine-classifier on a target.

FIG. 3 is a process flow chart showing certain steps of an example of a mine-classification process performed by the mine-classifier 4 on a target that is useful for understanding the invention. The mine classification process described below with reference to FIG. 3 makes a novel use of a particle filter's implementation of a Sequential Importance Sampling technique. General implementation details of the particle filter itself correspond to those given (for a different use of the particle filter, i.e. for estimating the future state of a system that changes over time) in "*A Tutorial on Particle filters for Online Nonlinear/Non-Gaussian Bayesian Tracking*", Arulampalam, M. Sanjeev et al, the contents of which are incorporated herein by reference.

At step s2, the particle filter module 22 receives the mine model set 30 from the mine model store 24. The mine model set 30 comprises the first model 26 and the second model 28.

The first model 26 comprises values of an observation parameter for a mine of a first mine-type as a function of a measurement variable. In this example the measurement variable is the angle from which the mine is observed. The second model 28 comprises values of an observation parameter for a mine of a second mine-type as a function of the measurement variable. In this example, the observation parameter is the same for both first and second models 26, 28. The observation parameter is a quantity that characterises the target, and that can be detected by the mine-hunting vessel 2 via the sensor 3. In this example, the observation parameter is the amplitude of a returned sonar pulse.

Figure 4A:
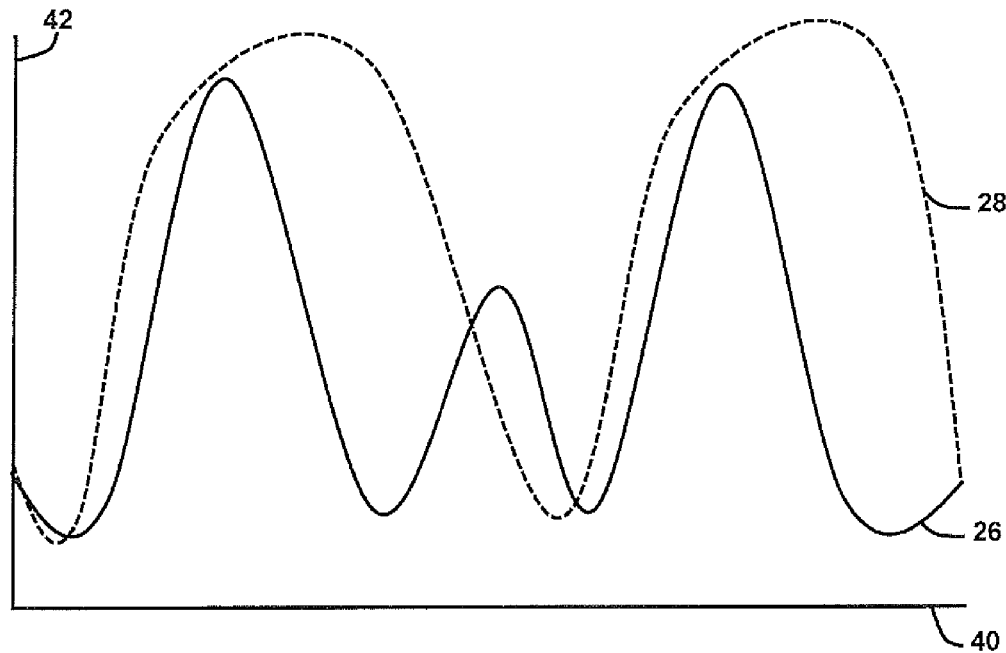
FIG. 4A is an x-y graph showing respective graphical representations of a first model and a second model on common axes.

FIG. 4A is an x-y graph showing respective graphical representations of the first model 26 and the second model 28 on common axes. The x-axis 40 is the angle from which the target or mine is observed by the mine-hunting vessel 2. The x-axis ranges from 0 degrees to 360 degrees. The y-axis 42 is the value of the observation parameter measured by the mine-hunting vessel 2 when observing the target or mine. Thus, the mine models 26, 28 are represented by lines on the x-y graph that indicate the values of the observation parameter that is detected when a mine of that type is observed from a particular angle by the mine-hunting vessel 2. In practice, the first model 26 and the second model 28 are models of real-life mines and a greater number of models would be used. However, for the purposes of clarity and ease of explanation, in this example the first and second model lines on the x-y graph FIG. 4A are not necessarily indicative of real-life mines and serve only to show differences between first and second models for the purposes of aiding the following description.

At step s4, a plurality of particles is defined on each of the first and second models. In this example, a particle is defined as a single point on a model graph, i.e. a single particle has a specific model type, a specific angle value (i.e. x-axis value) and a specific observation parameter value (i.e. y-axis value) for that angle. In this example, the parameter store 32 provides a parameter set 34 to the particle filter module 22. In this example the parameter set 34 comprises the above mentioned particles defined in terms of model, angle (i.e. x-axis value) and weight (see later). Thus, in this example, each particle's observation parameter value follows from its model and angle.

In this example, five particles $a_1$ to $a_5$ are defined on the first model 26 and five particles $b_1$ to $b_5$ are defined on the second model 28. In this example, the particles are randomly distributed across the model, i.e. in this example, a particle has a specific model type, a specific random angle value and a specific observation parameter value associated with the model type and random angle.

Figure 4B:
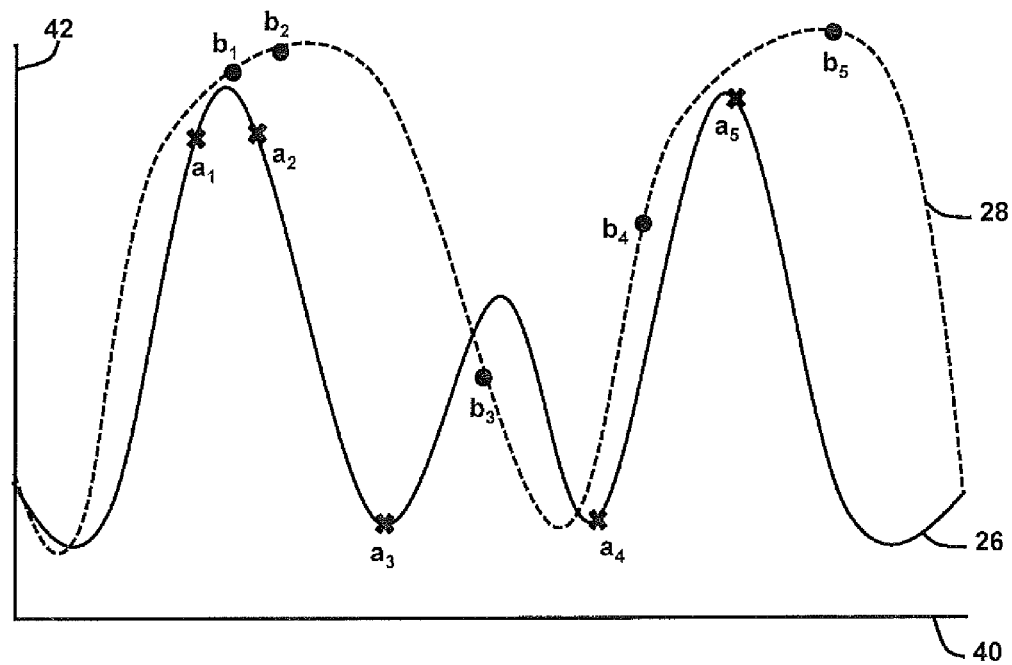
FIG. 4B is an x-y graph showing particles of a first model and particles of a second model.

FIG. 4B is an x-y graph showing particles $a_1$ to $a_5$ of the first model 26 and particles $b_1$ to $b_5$ of the second model 28.

At step s6, an initial weight value is assigned to each of the particles $a_1$ to $a_5$ and $b_1$ to $b_5$. In this example, the initial weight values assigned to the particles are all equal, i.e. a uniform weight distribution is initially assigned to the particles. In this example, each of the particles $a_1$ to $a_5$ and $b_1$ to $b_5$ is initially assigned a weight value of ten, as shown in Table 1 below.

TABLE 1

| first model 26 | | second model 28 | |
| --- | --- | --- | --- |
| particle | weight | particle | weight |
| $a_1$ | 10 | $b_1$ | 10 |
| $a_2$ | 10 | $b_2$ | 10 |
| $a_3$ | 10 | $b_3$ | 10 |
| $a_4$ | 10 | $b_4$ | 10 |
| $a_5$ | 10 | $b_5$ | 10 |
| sum | 50 | sum | 50 |

Thus, in this example the sum of the weight values of each model is equal to fifty. Also, the sum of the weight values of all the particles is equal to one hundred.

In this example, the sum of the weight values of all the particles is made constant, i.e. in the following steps, the sum of the weights of all the particles $a_1$ to $a_5$ and $b_1$ to $b_5$ will be kept equal to one hundred. In this example, keeping the sum of the particle weights equal to one hundred serves the purpose of clarity and ease of explanation.

Figure 4C:
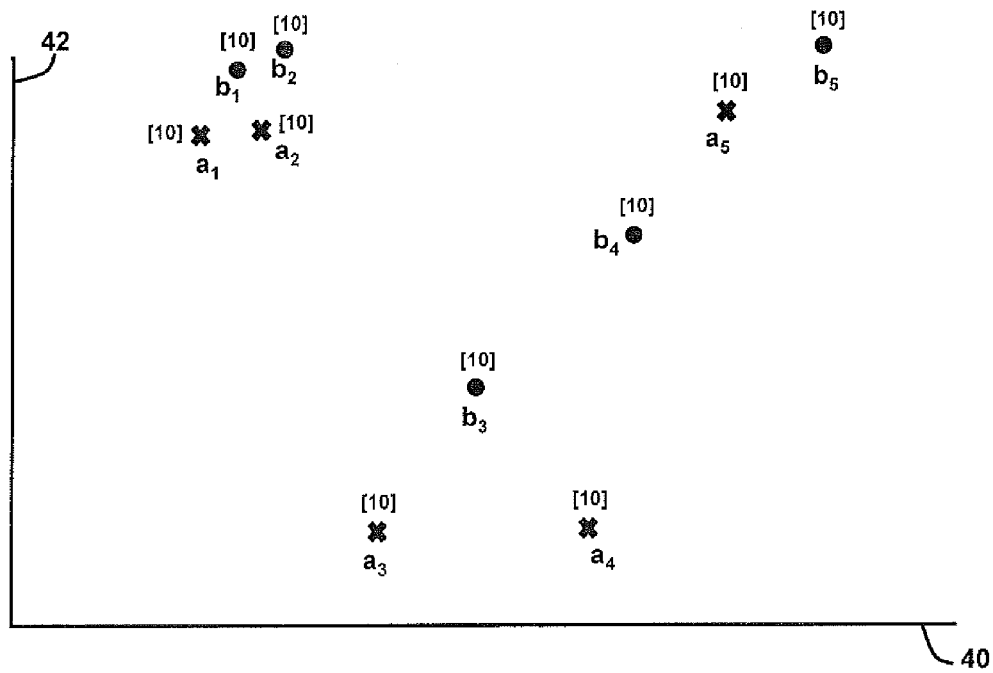
FIG. 4C is an x-y graph showing particles of a first and a second model and the respective initial weights assigned to each of the particles.

FIG. 4C is an x-y graph showing particles $a_1$ to $a_5$ of the first model 26, and particles $b_1$ to $b_5$ of the second model 28. Moreover, FIG. 4C shows the respective initial weights assigned to each of the particles, $a_1$ to $a_5$ and $b_1$ to $b_5$. The respective weights are shown in square brackets [ ] adjacent to the particle to which the weight value is assigned. The inclusion of the weight values in FIG. 4C, and certain later Figures, is for the purpose of aiding the reader's understanding of the mine-classification process being described.

At step s8, a first observation is made of the target by the mine-hunting vessel 2. In this example, the mine-hunting vessel 2 observes the target and measures a first specific value of the observation parameter.

Figure 4D:
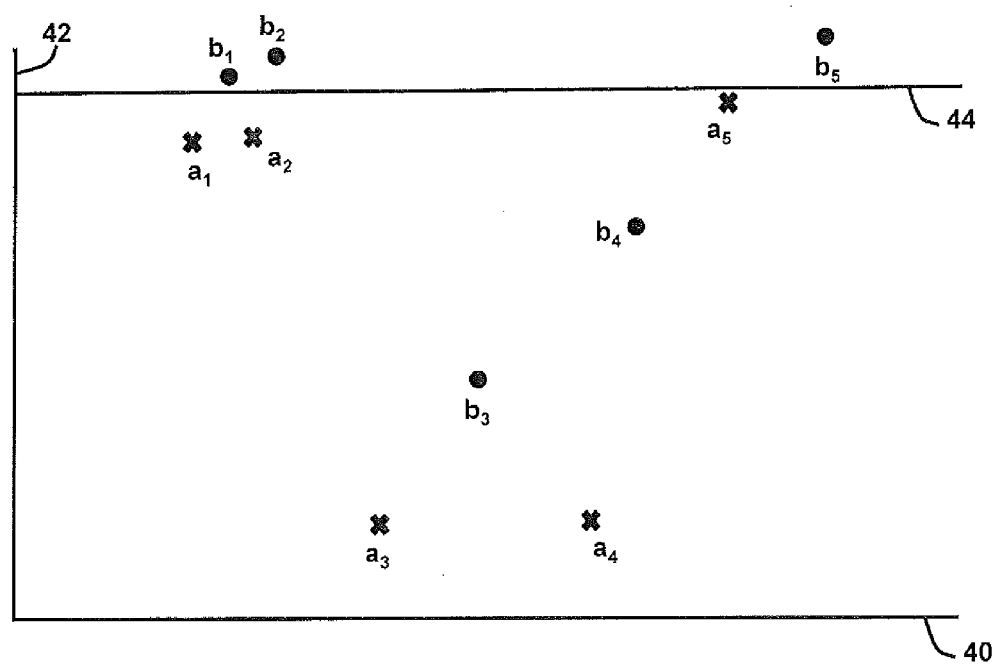
FIG. 4D is an x-y graph showing particles of a first model, particles of a second model, and a first observation value.

FIG. 4D is an x-y graph showing particles $a_1$ to $a_5$ of the first model 26, particles $b_1$ to $b_5$ of the second model 28, and a first observation value 44. The first observation value 44 is shown in FIG. 4D as a line with a constant observation parameter value across all possible angles. This is because, in this example, it is not known at which angle relative to the models 26, 28 the mine-hunting vessel 2 is observing the target.

At step s10, the initial weights assigned to the particles $a_1$ to $a_5$ and $b_1$ to $b_5$ are reassigned. In this example, the sum of the weight values of all the particles is kept constant, i.e. equal to one hundred, as described above with reference to FIG. 4C. Thus, in this example, the process of reassigning the initial weights is equivalent to a process of redistributing the initially assigned weight across the particles. The terminology "redistributing" is used hereinafter to describe a process of reassigning weights where the value of the sum of the weights is kept constant. In this example, the initial weights are redistributed depending on the Euclidean distance between the particle and the first observation value line 44. The initial weights are redistributed such that the weights of particles on or near the first observation value line 44 is increased and the weights of particles not near the first observation value line 44 is decreased.

Figure 4E:
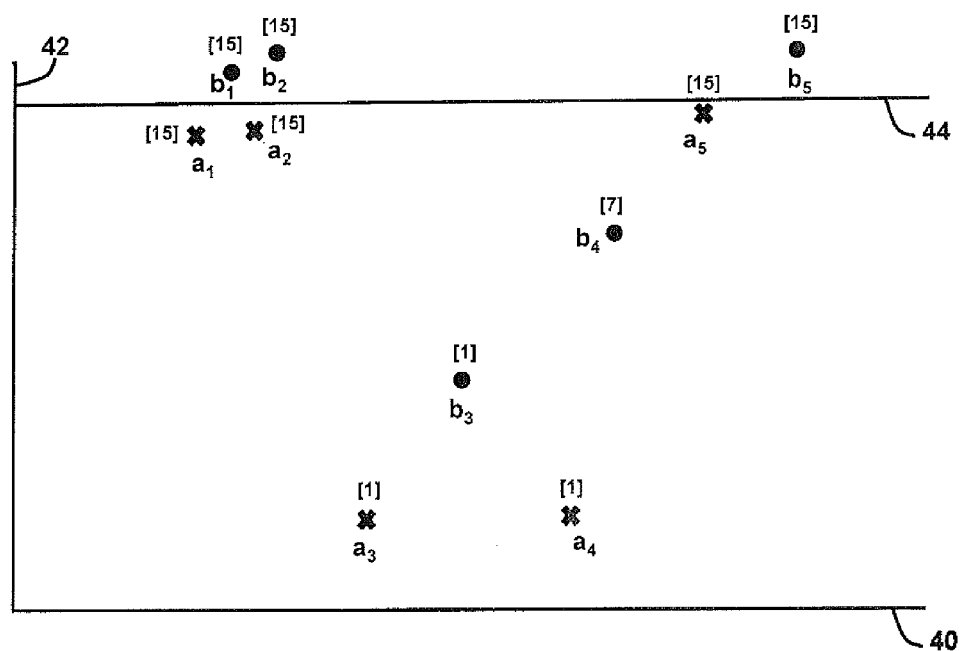
FIG. 4E is an x-y graph showing particles of a first and second model, a first observation value line, and the respective redistributed weight values assigned to each of the particles at step s10 of the mine-classification process.

FIG. 4E is an x-y graph showing particles $a_1$ to $a_5$ of the first model 26, particles $b_1$ to $b_5$ of the second model 28, the first observation value line 44, and the respective redistributed weight values assigned to the particles $a_1$ to $a_5$ and $b_1$ to $b_5$ at step s10. The respective redistributed weights are shown in square brackets [ ] adjacent to the particle to which the weight value is assigned.

The redistributed weight values at step s10 are shown below in Table 2. In this example the sum of the weights of all the particles is kept constant, i.e. the sum of the weights of all the particles equals one hundred, as described above with reference to FIG. 4C.

TABLE 2

| first model 26 | | second model 28 | |
| --- | --- | --- | --- |
| particle | weight | particle | weight |
| $a_1$ | 15 | $b_1$ | 15 |
| $a_2$ | 15 | $b_2$ | 15 |
| $a_3$ | 1 | $b_3$ | 1 |
| $a_4$ | 1 | $b_4$ | 7 |
| $a_5$ | 15 | $b_5$ | 15 |
| sum | 47 | sum | 53 |

At step s12, the mine-hunting vessel 2 moves from its original position to a new position relative to the target. In this example, the mine-hunting vessel moves around the target by a first known angle 46. The first known angle 46 can be controlled by the mine-hunting vessel 2 and/or any user of the mine-hunting vessel 2 by, for example, tracking the position of the mine-hunting vessel using a Global Positioning System (GPS), or inertial navigation.

Figure 4F:
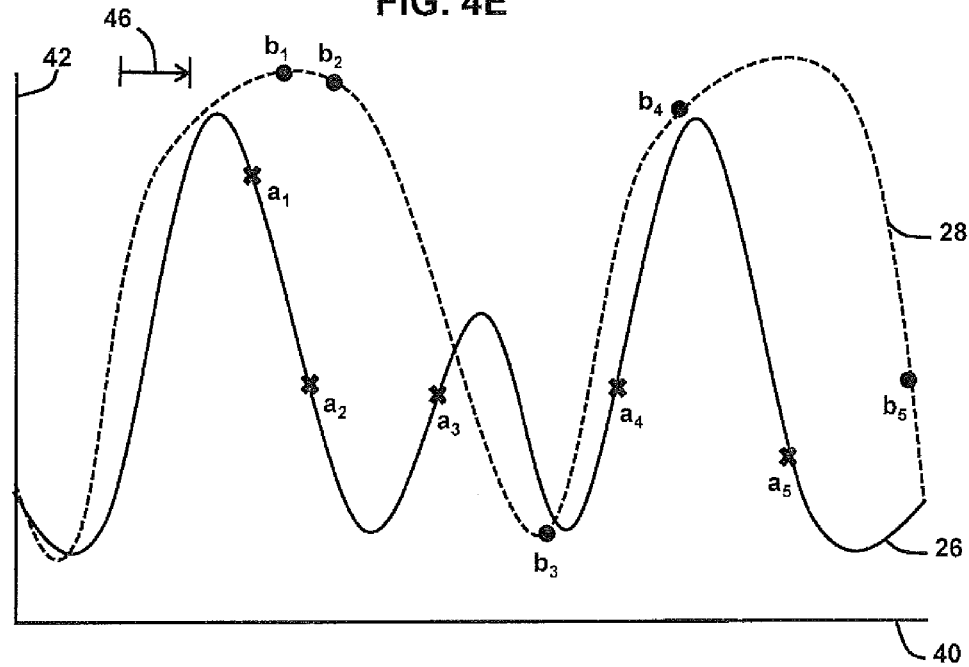
FIG. 4F is an x-y graph showing a first known angle, a first and second model, particles of the first model in their new position, and particles of the second model in their new position.

The x-coordinate (angle) of the particles $a_1$ to $a_5$ and $b_1$ to $b_5$ is changed by an amount equal to the first known angle, 46. FIG. 4F is an x-y graph showing the first known angle 46, the first model 26, particles $a_1$ to $a_5$ of the first model 26 in their new position, the second model 28, and particles $b_1$ to $b_5$ of the second model 28 in their new position. Thus, each particle has a new position on the either the first model 26 or the second model 28 (e.g. compare the new position of particle $a_1$ in FIG. 4F to its previous position in FIG. 4B). Consequently, the value of the observation parameter for each of the particles $a_1$ to $a_5$ and $b_1$ to $b_5$ has correspondingly altered according to the new angle (x-axis) and the mine model 26, 28 to which a particle is assigned (e.g. at its new position in FIG. 4F the particle has a different y-axis value compared to its y-axis value when it was at its earlier position of e.g. FIG. 4B).

Figure 4G:
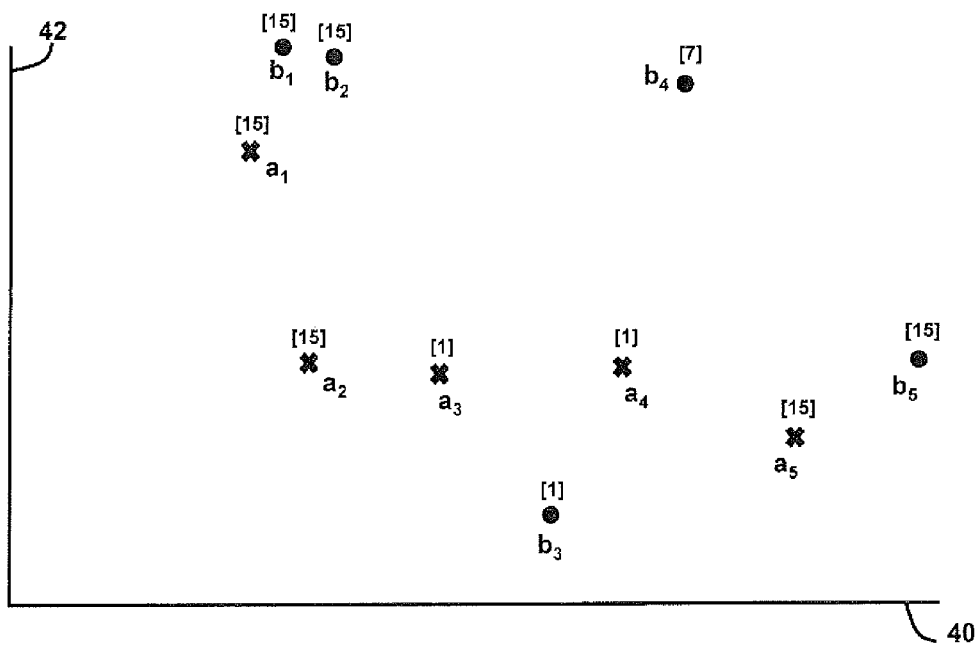
FIG. 4G is a is an x-y graph showing particles of a first and second model, and the respective redistributed weight values assigned to each of the particles at step s10 of the mine-classification process.

For completeness, FIG. 4G is an x-y graph showing the new positions of the particles $a_1$ to $a_5$ of the first model 26, the new positions of the particles $b_1$ to $b_5$ of the second model 28, and the respective redistributed weight values as already assigned to the particles $a_1$ to $a_5$ and $b_1$ to $b_5$ at earlier step s10 and as shown above in Table 2. The respective redistributed weights are shown in square brackets [ ] adjacent to the particle to which the weight value is assigned.

Figure 4H:
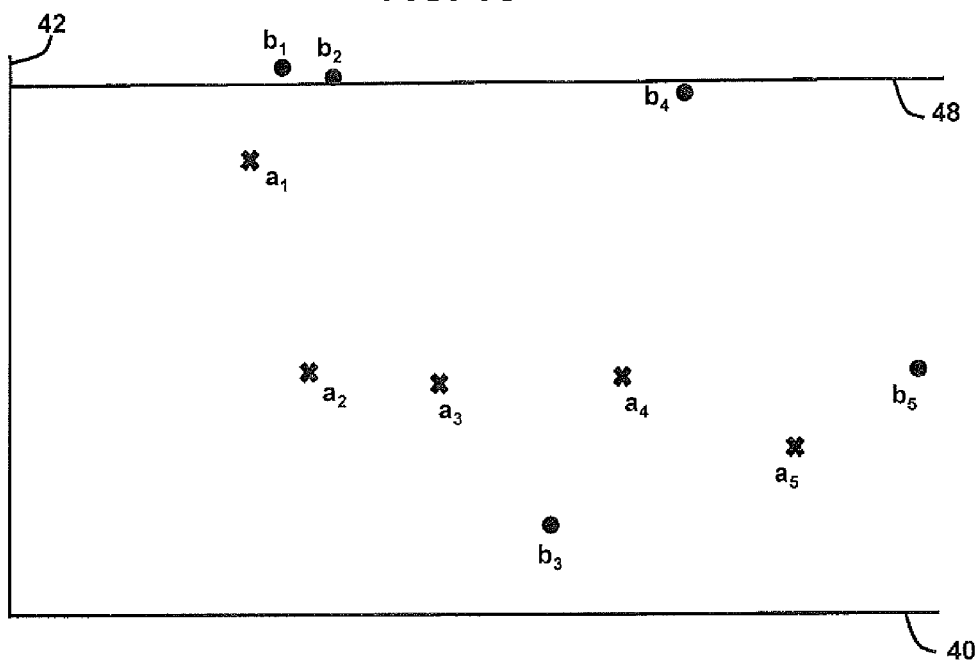
FIG. 4H is an x-y graph showing particles of a first and second model, and a second observation value.

At step s14, a second observation is made of the target by the mine-hunting vessel 2. The mine-hunting vessel 2 measures a second specific value of the observation parameter. FIG. 4H is an x-y graph showing particles $a_1$ to $a_5$ of the first model 26, particles $b_1$ to $b_5$ of the second model 28, and a second observation value 48. The second observation value 48 is shown in FIG. 4H as a line with a constant observation parameter value across all possible angles. This is because it is unknown at which angle relative to the models 26, 28 the mine-hunting vessel 2 is observing the target.

At step s16, the present weights assigned to the particles $a_1$ to $a_5$ and $b_1$ to $b_5$ are redistributed. In this example, the present weights are redistributed depending on the Euclidean distance between the particle and the second observation value line 48. The initial weights are redistributed such that the weights of particles on or near the second observation value line 48 is increased and the weights of particles not near the second observation value line 48 is decreased. In this embodiment the present weights are redistributed using the same methodology as the redistribution of the initial weights in step s10. As mentioned above, in this example, the sum of the weight values of all the particles is kept constant, i.e. equal to one hundred.

Figure 4I:
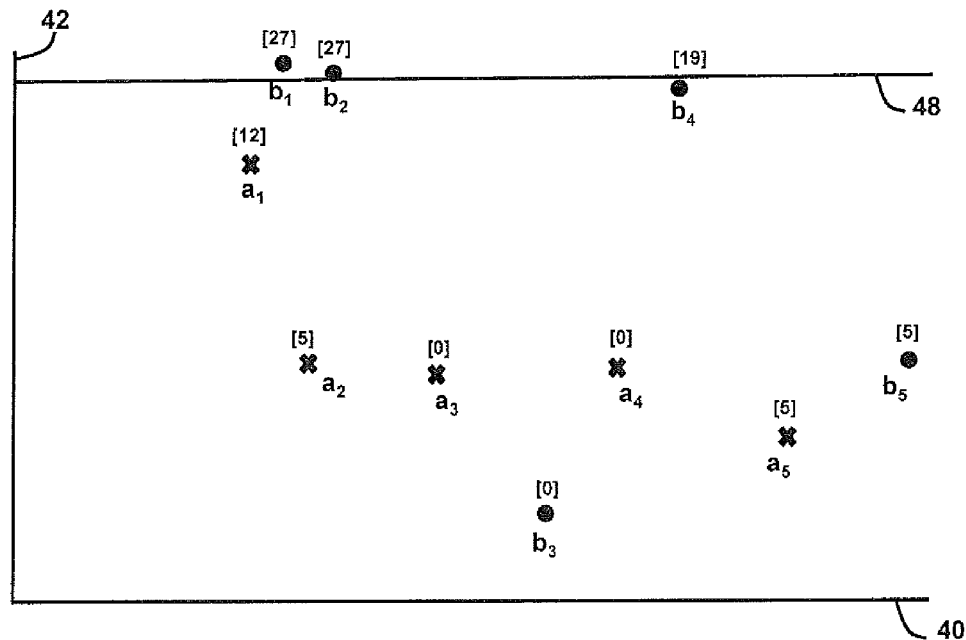
FIG. 4I is an x-y graph showing particles of a first and second model, a second observation value line, and the respective redistributed weight values assigned to each of the particles at step s16 of the mine-classification process.

FIG. 4I is an x-y graph showing particles $a_1$ to $a_5$ of the first model 26, particles $b_1$ to $b_5$ of the second model 28, the second observation value line 48, and the respective redistributed weight values assigned to the particles $a_1$ to $a_5$ and $b_1$ to $b_5$ at step s16. The respective redistributed weights are shown in square brackets [ ] adjacent to the particle to which the weight value is assigned.

The redistributed weight values at step s16 are shown below in Table 3.

TABLE 3

| first model 26 | | second model 28 | |
|---|---|---|---|
| particle | weight | particle | weight |
| $a_1$ | 12 | $b_1$ | 27 |
| $a_2$ | 5 | $b_2$ | 27 |
| $a_3$ | 0 | $b_3$ | 0 |
| $a_4$ | 0 | $b_4$ | 19 |
| $a_5$ | 5 | $b_5$ | 5 |
| sum | 22 | sum | 78 |

At step s18, the weights of the particles $a_1$ to $a_5$ of the first model 26 are summed. Also the weights of the particles $b_1$ to $b_5$ of the second model 28 are summed. In this example the sum of the weights of the particles $a_1$ to $a_5$ of the first model 26 equals twenty-two. In this example the sum of the weights of the particles $b_1$ to $b_5$ of the second model 28 equals seventy-eight.

At step s20, the respective probabilities that the target is a mine according to the first model 26 or the second model 28 are determined. In this example the determined probabilities are presented to a user, for example, to be used in a decision making process. In this example, the determined probabilities are presented to a user as part of the mine classification 10 that is output from the particle filter 22 of the mine-classifier 4, as described above with reference to FIGS. 1 and 2.

In this example the respective probabilities are determined using the following formula:

$$P(\text{target is of type } A) = \frac{\text{sum of weights of model } A \text{ particles}}{\text{sum of all particle weights}}$$

In this example the probability that the target is a mine according to the first model 26 is equal to 0.22, and the probability that the target is a mine according to the second model 28 is equal to 0.78.

The determined probabilities that are part of the mine classification 10 are also part of the position data 12 that is output from the particle filter 22 of the mine-classifier 4 and sent to the vessel position processor 6, as described above with reference to FIGS. 1 and 2. The position data 12 that is output from the particle filter 22 of the mine-classifier 4 will be described in more detail later below with reference to FIGS. 7 to 9.

In a further example, the mine-classification process described above with reference to FIG. 3 and FIG. 4A-4I is implemented such as to additionally include use of a process of a Sequential Importance Re-sampling.

Figure 5A:
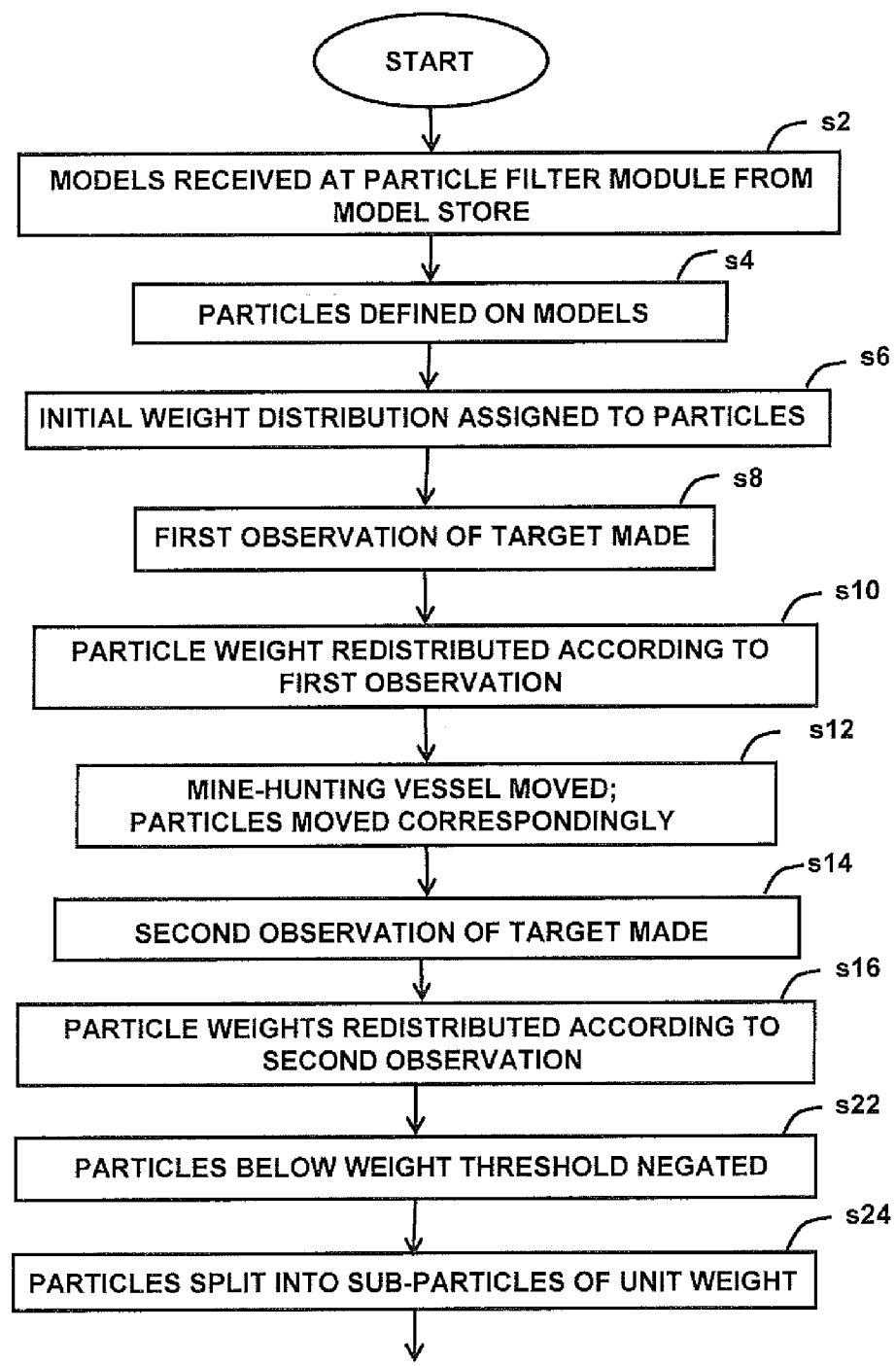
FIGS. 5A and 5B in combination are a process flow chart showing certain steps of an example of a mine-classification process using a Sequential Importance Re-sampling process performed by the mine-classifier on a target.
Figure 5B:
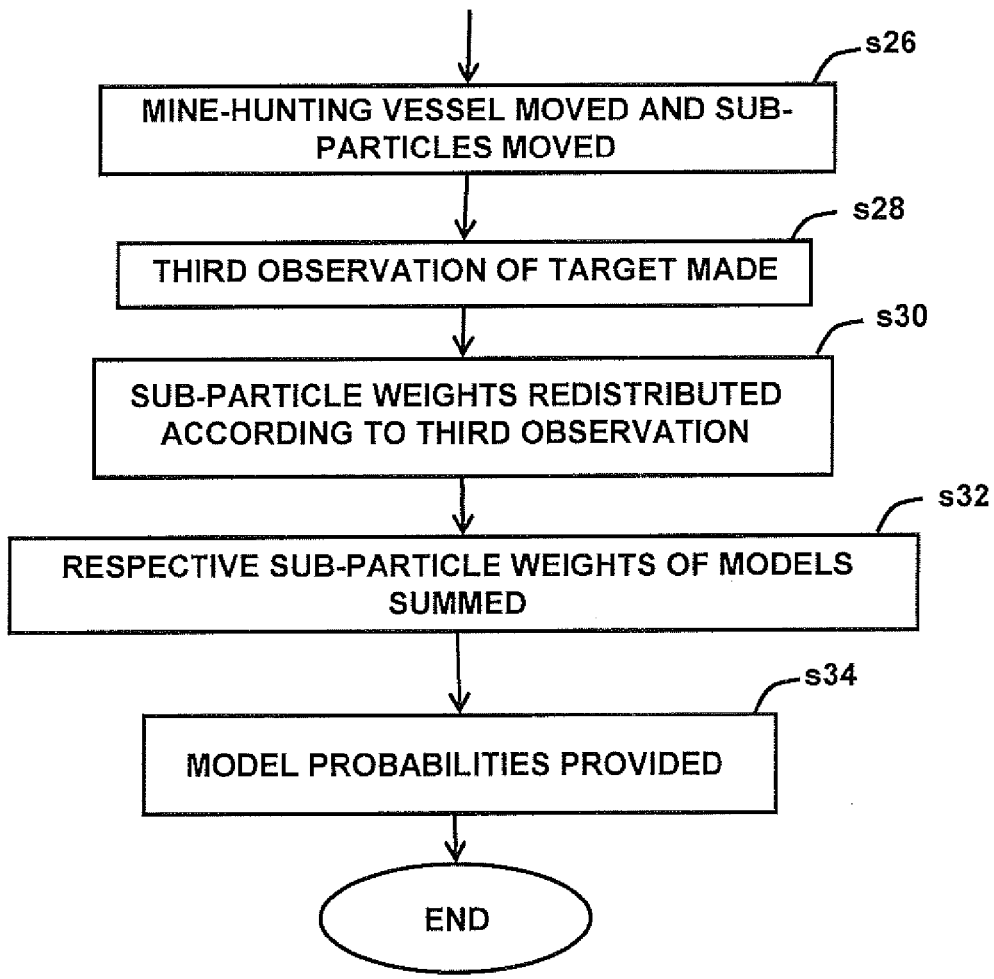

FIGS. 5A and 5B in combination are a process flow chart showing certain steps of this further example.

In this further example, steps s2, s4, s6, s8, s10, s12, s14 and s16 are performed in the same manner as the first example as described above with reference to FIG. 3 and FIGS. 4A-4I.

Thereafter, at step s22, particles with a weight value equal to or below a threshold value are negated or ignored from further processing and/or computation. In this example, the threshold value is five, i.e. particles with a weight value less than or equal to five are deleted from the process or ignored from future processing steps. In this example particles $a_2$ to $a_5$, $b_3$ and $b_5$ have a weight value of less than or equal to five and are therefore negated.

Figure 6E:
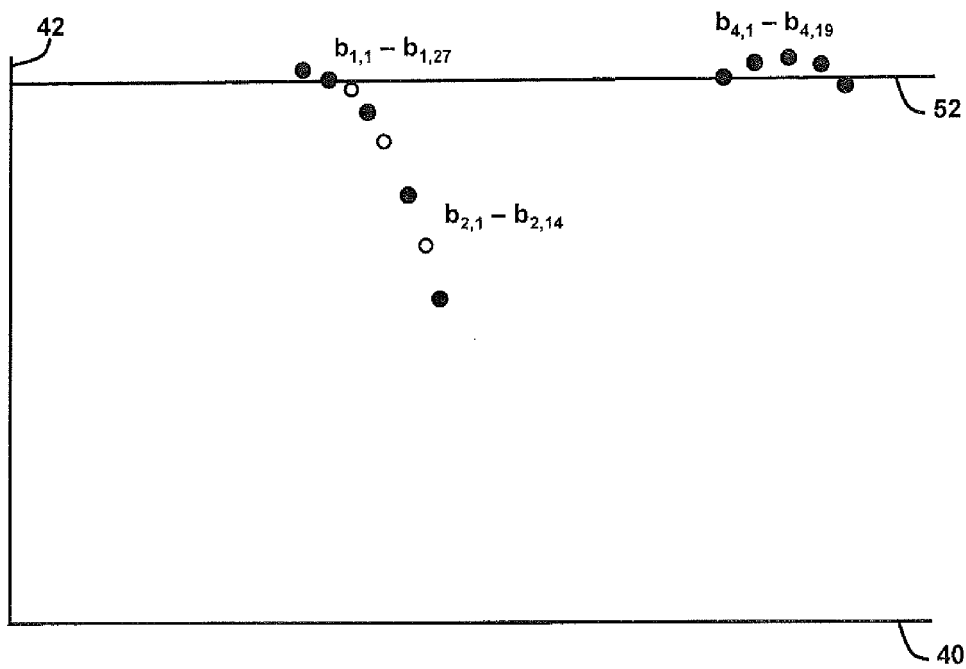
FIG. 6E is an x-y graph showing remaining sub-particles after the redistribution of the unit weights according to the third observation value.
Figure 6A:
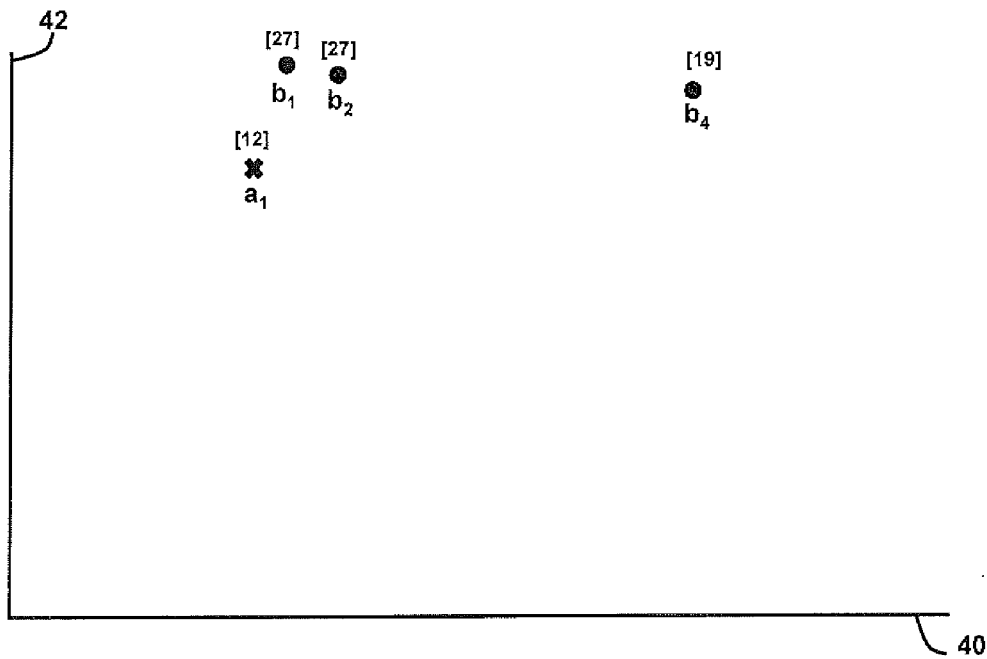
FIG. 6A is an x-y graph showing the remaining particles and their respective weights, after the removal of particles with a weight value less than or equal to the threshold value.

FIG. 6A is an x-y graph showing the remaining particles and their respective weights, after the removal of particles with a weight value less than or equal to the threshold value. FIG. 6A shows the particle $a_1$ of the first model 26 and particles $b_1$, $b_2$ and $b_4$ of the second model 28, and their respective weights.

At step s24, each remaining particle is divided into a number of sub-particles. In this example, each particle is divided into a plurality of sub-particles. The number of sub-particles in the plurality of sub-particles is equal to the weight value assigned to the particle being divided. Each sub-particle in a plurality of sub-particles is assigned unit weight. The sub-particles are distributed on the model to which the particle that they were divided from belonged. The sub-particles are distributed such that they lie on the relevant model line, in the vicinity of the position of the particle from which they were divided. In this example the sub-particles are distributed uniformly in a range about the position of the particle from which they were divided. However, in other examples the sub-particles are distributed in a different way, for example according to a Normal distribution about the position of the particle from which they were divided, or such that the sub-particle lie at the same point as the particle from which they were divided.

In this example, particle $a_1$ of the first model 26 has a weight value equal to twelve. Thus particle $a_1$ is divided into twelve sub-particles ($a_{1,1}$-$a_{1,12}$) each with weight value equal to one. In this example, particle $b_1$ of the second model 28 has a weight value equal to twenty-seven. Thus particle $b_1$ is divided into twenty-seven sub-particles ($b_{1,1}$-$b_{1,27}$) each with weight value equal to one. In this example, particle $b_2$ of the second model 28 has a weight value equal to twenty-seven. Thus particle $b_2$ is divided into twenty-seven sub-particles ($b_{2,1}$-$b_{2,27}$) each with weight value equal to one. In this example, particle $b_4$ of the second model 28 has a weight value equal to nineteen. Thus particle $b_4$ is divided into nineteen sub-particles ($b_{4,1}$-$b_{1,19}$) each with weight value equal to one. In this example the sum of the weight values of the first model 26 is equal to twelve. In this example the sum of the weight values of the second model 28 is equal to seventy-three. Also, the sum of the weight values of all the sub-particles is equal to eighty-five. In this example, the sum of the weight values of all the sub-particles is made constant, i.e. in the following steps, the sum of the weights of all the sub-particles $a_{1,1}$-$a_{1,12}$, $b_{1,1}$-$b_{1,27}$, $b_{2,1}$-$b_{2,27}$, and $b_{4,1}$-$b_{1,19}$ will be kept equal to eighty-five.

Figure 6B:
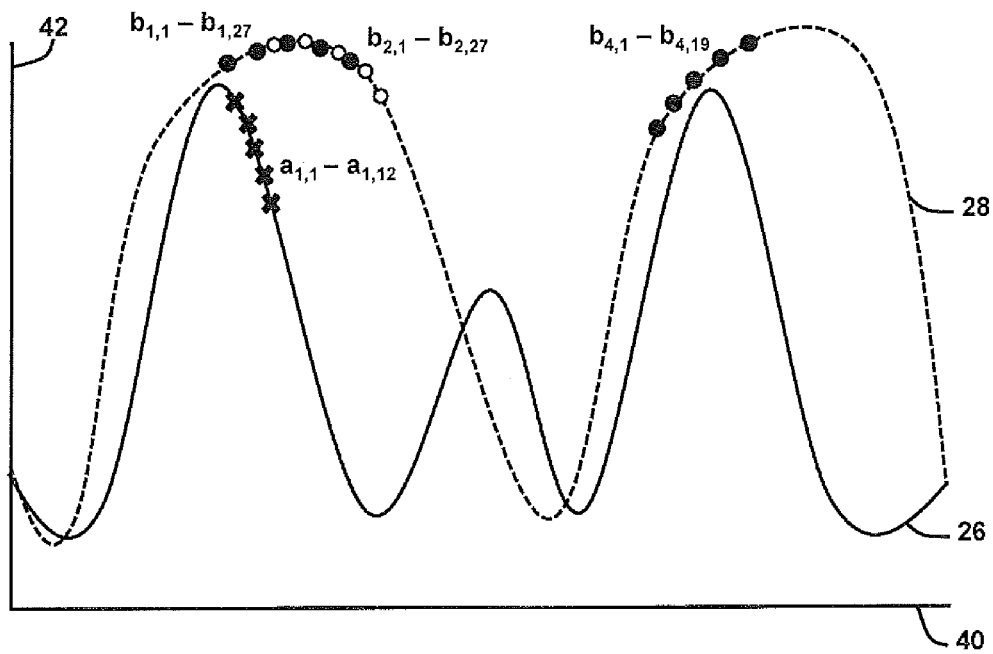
FIG. 6B is an x-y graph showing the first model and second model, and the sub-particles of the first and second models.

FIG. 6B is an x-y graph showing the first model 26 and the second model 28. FIG. 6B also shows the sub-particles $a_{1,1}$-$a_{1,12}$ of the first model 26, (of which only five sub-particles are shown for reasons of clarity), and the sub-particles $b_{1,1}$-$b_{1,27}$, $b_{2,1}$-$b_{2,27}$, and $b_{4,1}$-$b_{1,19}$ of the second model 28 (of which only five of each of $b_{1,1}$-$b_{1,27}$, $b_{2,1}$-$b_{2,27}$, and $b_{4,1}$-$b_{1,19}$ are shown for reasons of clarity). The five sub-particles of the set $b_{2,1}$-$b_{2,27}$ shown in FIG. 6B are depicted using open circles so that they can be readily distinguished from the five sub-particles of the set $b_{1,1}$-$b_{1,27}$, which are depicted using closed circles.

At step s26, the mine-hunting vessel 2 moves from its original position to a new position relative to the target. In this example, the mine-hunting vessel moves around the target by a second known angle 50. The second known angle 50 can be determined by the mine-hunting vessel 2 and/or any user of the mine-hunting vessel 2 by, for example, tracking the position of the mine-hunting vessel using a Global Positioning System (GPS), or inertial navigation.

The x-coordinate (angle) of each of the sub-particles $a_{1,1}$-$a_{1,12}$, $b_{1,1}$-$b_{1,27}$, $b_{2,1}$-$b_{2,27}$, and $b_{4,1}$-$b_{1,19}$ is increased by an amount equal to the second known angle, 50. The value of the observation parameter for each of the sub-particles $a_{1,1}$-$a_{1,12}$, $b_{1,1}$-$b_{1,27}$, $b_{2,1}$-$b_{2,27}$, and $b_{4,1}$-$b_{1,19}$ is altered according to the new angle and the mine model 26, 28 to which a particle is assigned. Thus, each sub-particle has a new position on the either the first model 26 or the second model 28.

Figure 6C:
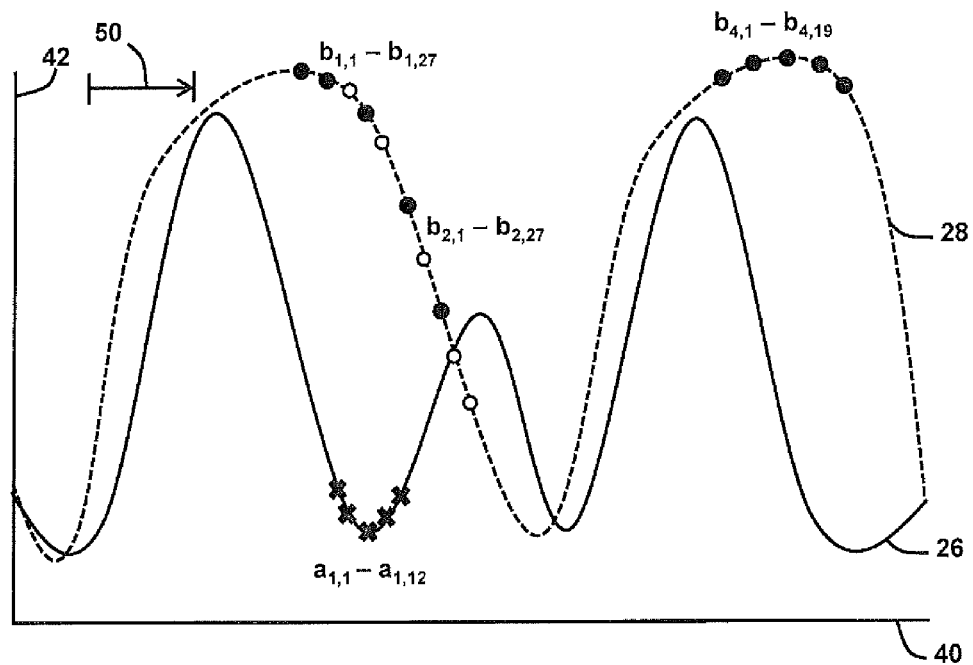
FIG. 6C is an x-y graph showing a second known angle, the first and second models, and the sub-particles of the first and second models in their new positions.

FIG. 6C is an x-y graph showing the second known angle 50, the first model 26, sub-particles $a_{1,1}$-$a_{1,12}$ of the first model 26 in their new position, the second model 28, and sub-particles $b_{1,1}$-$b_{1,27}$, $b_{2,1}$-$b_{2,27}$, and $b_{4,1}$-$b_{1,19}$ of the second model 28 in their new positions. Only five sub-particles of each of $b_{1,1}$-$b_{1,27}$, $b_{2,1}$-$b_{2,27}$, and $b_{4,1}$-$b_{1,19}$ are shown in FIG. 6C for reasons of clarity. The five sub-particles of the set $b_{2,1}$-$b_{2,27}$ shown in FIG. 6C are depicted using open circles so that they can be readily distinguished from the five sub-particles of the set $b_{1,1}$-$b_{1,27}$, which are depicted using closed circles.

At step s28, a third observation is made of the target by the mine-hunting vessel 2. In this example, the mine-hunting vessel 2 measures a third specific value of the observation parameter.

Figure 6D:
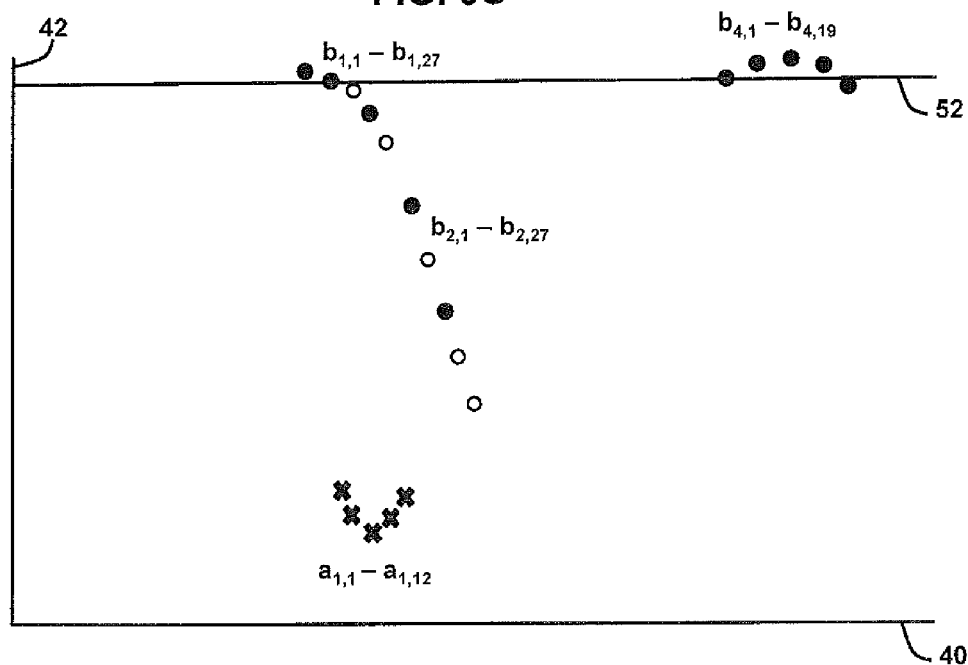
FIG. 6D is an x-y graph showing the sub-particles of the first and second models, and a third observation value.

FIG. 6D is an x-y graph showing sub-particles $a_{1,1}$-$a_{1,12}$ of the first model 26, sub-particles $b_{1,1}$-$b_{1,27}$, $b_{2,1}$-$b_{2,27}$, and $b_{4,1}$-$b_{1,19}$ of the second model 28, and a third observation value 52. The third observation value 52 is shown in FIG. 6D as a line with a constant observation parameter value across all possible angles. This is because it is unknown at which angle relative to the models 26, 28 the mine-hunting vessel 2 is observing the target. Only five sub-particles of each of $b_{1,1}$-$b_{1,27}$, $b_{2,1}$-$b_{2,27}$, and $b_{4,1}$-$b_{1,19}$ are shown in FIG. 6D for reasons of clarity. The five sub-particles of the set $b_{2,1}$-$b_{2,27}$ shown in FIG. 6D are depicted using open circles so that they can be readily distinguished from the five sub-particles of the set $b_{1,1}$-$b_{1,27}$, which are depicted using closed circles.

At step s30, the present unit weights assigned to the sub-particles $a_{1,1}$-$a_{1,12}$, $b_{1,1}$-$b_{1,27}$, $b_{2,1}$-$b_{2,27}$, and $b_{4,1}$-$b_{1,19}$ are redistributed. In this example, the present unit weights are redistributed depending on the Euclidean distance between the sub-particle and the third observation value line 52. The present unit weights are redistributed such that the weights of sub-particles on or near the third observation value line 52 is increased and the weights of sub-particles not near the third observation value line 52 is decreased. In this embodiment the present weights are redistributed using the same methodology as the redistribution of the initial weights in step s10. In this example, the sum of the weight values of all the sub-particles is constant, i.e. equal to eighty-five. In this example, sub-particles with a redistributed weight value equal to zero are ignored or negated.

FIG. 6E is an x-y graph showing the remaining sub-particles after the redistribution of the unit weights in step s30 as described above. In this example the sub-particles $a_{1,1}$-$a_{1,12}$ and $b_{2,15}$-$b_{2,27}$ have a redistributed weight equal to zero. Thus, the sub-particles $a_{1,1}$-$a_{1,12}$ and $b_{2,15}$-$b_{2,27}$ are negated. FIG. 6E shows sub-particles $b_{1,1}$-$b_{1,27}$, $b_{2,1}$-$b_{1,14}$ and $b_{4,1}$-$b_{1,19}$ of the second model 28, and the third observation value line 52. Only five sub-particles of each of $b_{1,1}$-$b_{1,27}$ and $b_{4,1}$-$b_{1,19}$ are shown in FIG. 6E for reasons of clarity. Only three sub-particles of each of $b_{2,1}$-$b_{2,14}$ are shown in FIG. 6E for reasons of clarity. The three sub-particles of the set $b_{2,1}$-$b_{2,14}$ shown in FIG. 6E are depicted using open circles so that they can be readily distinguished from the five sub-particles of the set $b_{1,1}$-$b_{1,27}$, which are depicted using closed circles.

The redistributed weight values at step s30 are shown below in Table 4. As mentioned above, in this example the sum of the weights of all the sub-particles is kept constant, i.e. the sum of the weights of all the sub-particles equals eighty-five, as described above with reference to step s24.

TABLE 4

| Particle | Weight | Particle | Weight | Particle | Weight |
|---|---|---|---|---|---|
| $b_{1,1}$ | 1.6 | $b_{2,1}$ | 1.6 | $b_{4,1}$ | 1.6 |
| $b_{1,2}$ | 1.6 | $b_{2,2}$ | 1.6 | $b_{4,2}$ | 1.6 |
| $b_{1,3}$ | 1.6 | $b_{2,3}$ | 1.6 | $b_{4,3}$ | 1.6 |
| $b_{1,4}$ | 1.6 | $b_{2,4}$ | 1.6 | $b_{4,4}$ | 1.6 |
| $b_{1,5}$ | 1.6 | $b_{2,5}$ | 1 | $b_{4,5}$ | 1.6 |
| $b_{1,6}$ | 1.6 | $b_{2,6}$ | 1 | $b_{4,6}$ | 1.6 |
| $b_{1,7}$ | 1.6 | $b_{2,7}$ | 1 | $b_{4,7}$ | 1.6 |
| $b_{1,8}$ | 1.6 | $b_{2,8}$ | 1 | $b_{4,8}$ | 1.6 |
| $b_{1,9}$ | 1.6 | $b_{2,9}$ | 1 | $b_{4,9}$ | 1.6 |
| $b_{1,10}$ | 1.6 | $b_{2,10}$ | 1 | $b_{4,10}$ | 1.6 |
| $b_{1,11}$ | 1.6 | $b_{2,11}$ | 1 | $b_{4,11}$ | 1.6 |
| $b_{1,12}$ | 1.6 | $b_{2,12}$ | 1 | $b_{4,12}$ | 1.6 |
| $b_{1,13}$ | 1.6 | $b_{2,13}$ | 1 | $b_{4,13}$ | 1.6 |
| $b_{1,14}$ | 1.6 | $b_{2,14}$ | 0.8 | $b_{4,14}$ | 1.6 |
| $b_{1,15}$ | 1.6 | | | $b_{4,15}$ | 1.6 |
| $b_{1,16}$ | 1.6 | | | $b_{4,16}$ | 1.6 |
| $b_{1,17}$ | 1.6 | | | $b_{4,17}$ | 1.6 |
| $b_{1,18}$ | 1.6 | | | $b_{4,18}$ | 1.6 |
| $b_{1,19}$ | 1.6 | | | $b_{4,19}$ | 1.6 |
| $b_{1,20}$ | 1 | | | | |
| $b_{1,21}$ | 1 | | | | |
| $b_{1,22}$ | 1 | | | | |
| $b_{1,23}$ | 1 | | | | |
| $b_{1,24}$ | 1 | | | | |
| $b_{1,25}$ | 1 | | | | |
| $b_{1,26}$ | 1 | | | | |
| $b_{1,27}$ | 1 | | | | |

At step s32, the weights of the sub-particles ($b_{1,1}$-$b_{1,27}$, $b_{2,1}$-$b_{1,14}$ and $b_{4,1}$-$b_{1,19}$) are summed. In this example the sum of the weights of the sub-particles of the first model 26 equals zero. In this example the sum of the weights of the sub-particles ($b_{1,1}$-$b_{1,27}$, $b_{2,1}$-$b_{1,14}$ and $b_{4,1}$-$b_{1,19}$) of the second model 28 equals eighty-five.

At step s34, the respective probabilities that the target is a mine according to the first model 26 or the second model 28 are determined. In this example the determined probabilities are presented to a user, for example, to be used in a decision making process. In this example, the determined probabilities are presented to a user as part of the mine classification 10 that is output from the particle filter 22 of the mine-classifier 4, as described above with reference to FIGS. 1 and 2.

In this example the respective probabilities are determined using the following formula:

$$P(\text{target is of type } A) = \frac{\text{sum of weights of model } A \text{ sub-particles}}{\text{sum of all sub-particle weights}}$$

In this example the probability that the target is a mine according to the first model 26 is equal to zero, and the probability that the target is a mine according to the second model 28 is equal to one.

The determined probabilities that are part of the mine classification 10 are also part of the position data 12 that is output from the particle filter 22 of the mine-classifier 4 and sent to the vessel position processor 6, as described above with reference to FIGS. 1 and 2. The position data 12 that is output from the particle filter 22 of the mine-classifier 4 will be described in more detail later below with reference to FIGS. 7 to 9.

Thus, the above described processes tend to advantageously provide at least one target classification probability which indicates how probable it is that a present observation corresponds to a particular target of interest, given all previous observations.

A further advantage is that the above described processes tend to fuse multiple observations of a target. Thus, the above described processes tend to provide more accurate classification results. Also, the above described processes tend to overcome the problem of requiring sufficiently clear conditions.

A further advantage is that the above described processes tend to allow for autonomous mine-classification. Thus, the above described processes tend to overcome the problem of requiring a skilled operator.

A further advantage is that the above described processes tend to reduce uncertainty as to the target under observation.

A further advantage is that the above described processes tend to be advantageously flexible to deal with different types of real-life data.

A further advantage is that the above described processes tend to provide for faster classification.

An embodiment of a method for selecting a value or change in value of a measurement variable to be used for an observation of an object to be classified will now be described. This embodiment will be described in terms of being used as part of an overall process based on the above described examples of a mine-classification process. In this embodiment an embodiment of a process of entropy minimisation is incorporated into the above described mine-classification process. Nevertheless, it will be appreciated that this embodiment, and others described thereafter, represent embodiments in themselves without the inclusion of the classification process itself, and it will be further appreciated that they additionally or alternatively may be used with other types of classification process, including classification of objects other than mines and/or with classifiers that do not employ a particle filter. This embodiment will now be described with reference to FIGS. 7 to 9.

Figure 7A:
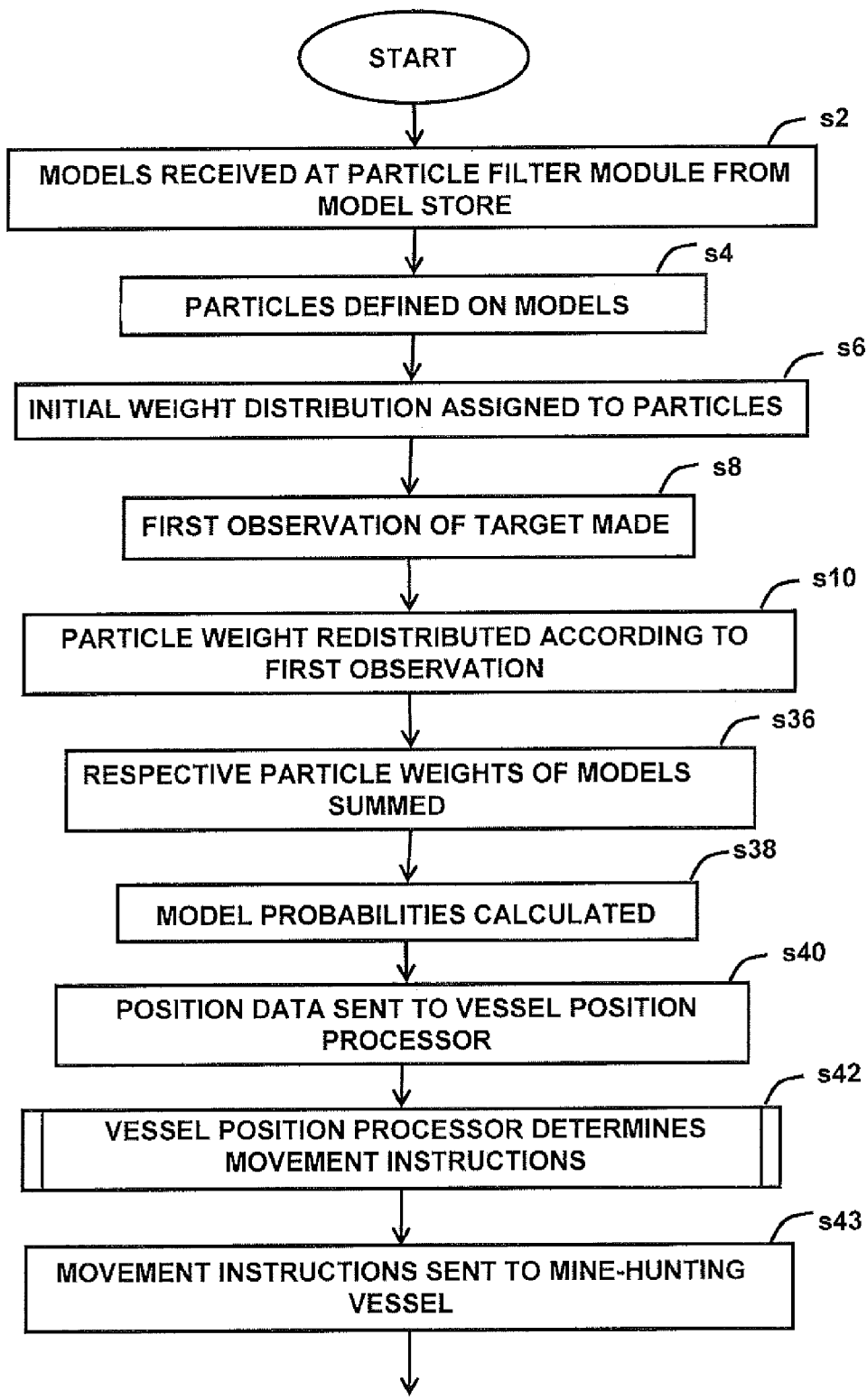
FIGS. 7A and 7B in combination are a process flowchart showing certain steps involved in an example of a mine-classification process in which an embodiment of a method for selecting a value or change in value of a measurement variable to be used for an observation of an object to be classified is used.
Figure 7B:
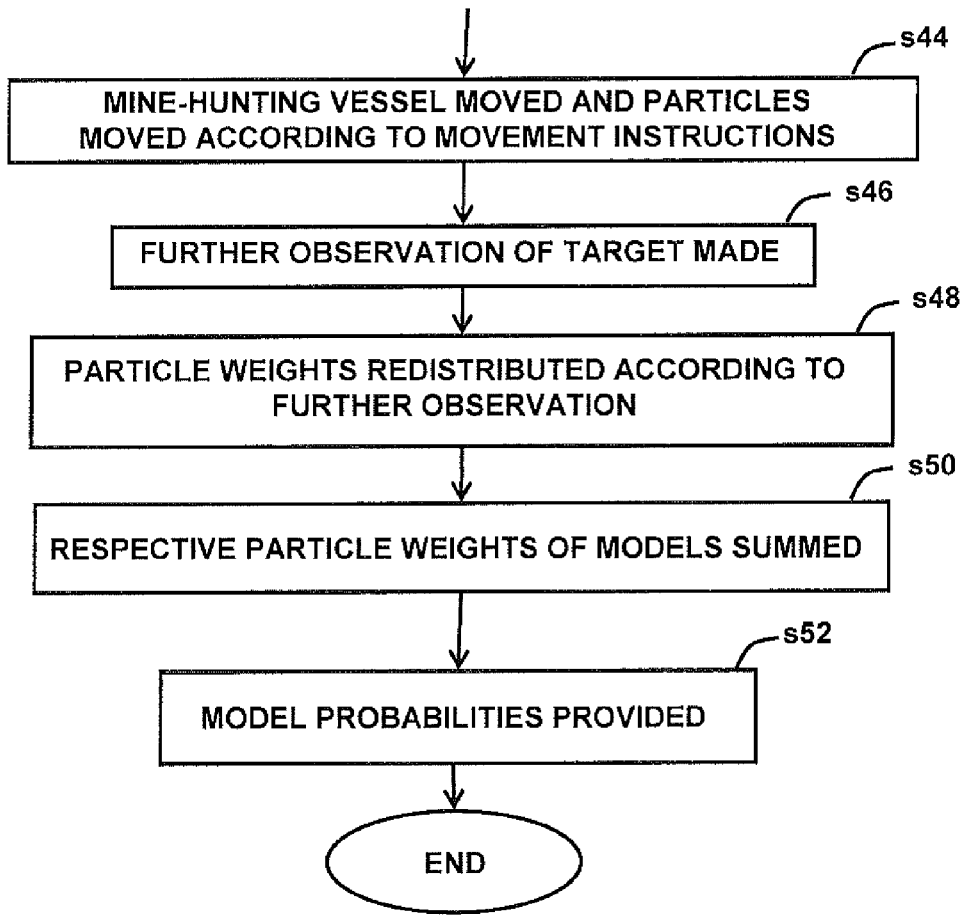

FIGS. 7A and 7B in combination are a process flowchart showing certain steps involved in an example of a mine-classification process in which this embodiment of a method for selecting a value or change in value of a measurement variable to be used for an observation of an object to be classified is used.

Steps s2, s4, s6, s8, and s10 are performed in the same manner as the first example, as described above with reference to FIG. 3 and FIGS. 4A-4E. The process then moves on to step s36.

At step s36, the redistributed weight values at step s10 (shown above with reference to Table 2 and FIG. 4E) of the particles the first and second models 26, 28 are summed. In this example the sum of the weights of all the particles is kept constant, i.e. the sum of the weights of all the particles equals one hundred, as described above with reference to FIG. 4C. In this example the sum of the weights of the particles $a_1$ to $a_5$ of the first model 26 equals forty-seven. In this example the sum of the weights of the particles $b_1$ to $b_5$ of the second model 28 equals fifty-three.

At step s38, the respective probabilities that the target is a mine according to the first model 26 or the second model 28 are determined. In this example the determined probabilities form part of the position data 12. In this example, the determined probabilities that form part of the position data 12 are also presented to a user as part of the mine classification 10 that is output from the particle filter 22 of the mine-classifier 4, as described above with reference to FIGS. 1 and 2.

In this example the respective probabilities are determined using the following formula:

$$P(\text{target is of type } A) = \frac{\text{sum of weights of model } A \text{ particles}}{\text{sum of all particle weights}}$$

In this example, after the first observation 44 has been made, the probability that the target is a mine according to the first model 26 is equal to 0.47, and the probability that the target is a mine according to the second model 28 is equal to 0.53.

At step s40, the position data 12 containing the probabilities determined at step s38, i.e. the probability that the target is a mine according to the first model 26 and the probability that the target is a mine according to the second model 28, is output from the particle filter 22 of the mine-classifier 4 and sent to the vessel position processor 6 (as described above with reference to FIGS. 1 and 2).

At step s42, the vessel position processor 6 determines the movement instructions 14 using the received position data 12 sent from the mine-classifier 4. The movement instructions 14 comprise a value of an optimum angular displacement 54. The optimum angular displacement 54 is an angle, relative to the target, by which the mine-hunting vessel 2 is to move in order to make an observation that is intended to best distinguish between the first model 26 and the second model 28. The process of calculating the optimum angular displacement 54, performed by the vessel position processor 6 is described in more detail later below with reference to FIG. 9.

At step s43, the movement instructions 14, which comprise the optimum angular displacement 54, are sent from the vessel position processor 6 to the mine-hunting vessel 2.

At step s44, the mine-hunting vessel 2 receives the movement instructions 14 from the vessel position processor 6 and moves from its original position to a new position, according to the received movement instructions 14. Thus, in this embodiment, the mine-hunting vessel is moved around the target by the optimum angular displacement 54. The movement of the mine-hunting vessel 2 by the optimum angular displacement 54 can be performed by the mine-hunting vessel 2 and/or any user of the mine-hunting vessel 2 by, for example, using a Global Positioning System (GPS) to track the position of the mine-hunting vessel 2, or by inertial navigation.

The x-coordinate (angle) of the particles $a_1$ to $a_5$ and $b_1$ to $b_5$ is increased by an amount equal to the optimum angular displacement 54. The value of the observation parameter for each of the particles $a_1$ to $a_5$ and $b_1$ to $b_5$ is altered according to the new angle and the mine model 26, 28 to which a particle is assigned. Thus, each particle has a new position on the either the first model 26 or the second model 28.

Figure 8A:
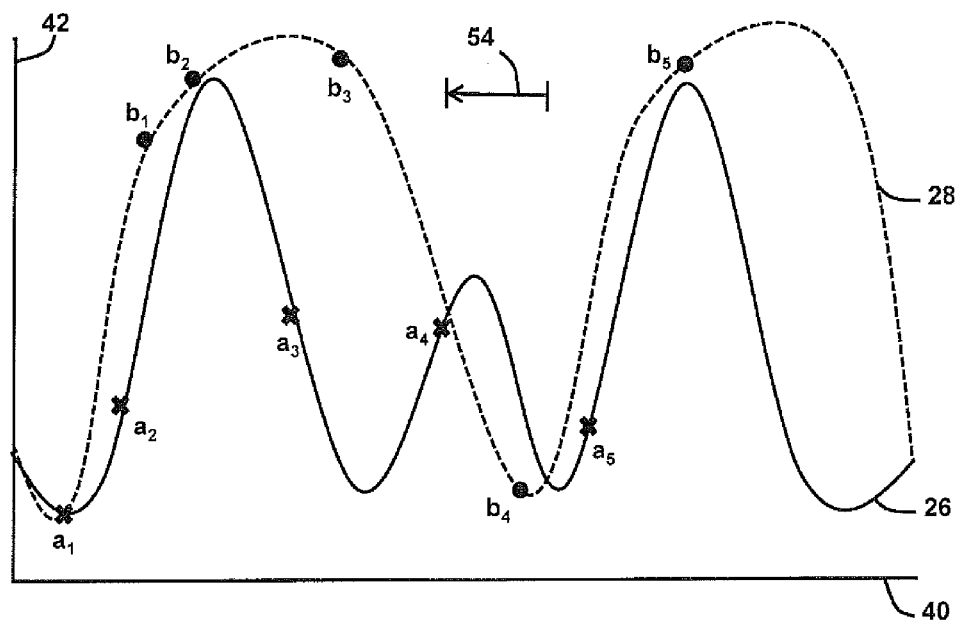
FIG. 8A is an x-y graph showing an optimum angular displacement, the first and second models, and the particles of the first and second models in their new positions.

FIG. 8A is an x-y graph showing the optimum angular displacement 54, the first model 26, particles $a_1$ to $a_5$ of the first model 26 in their new position, the second model 28, and particles $b_1$ to $b_5$ of the second model 28 in their new position.

Figure 8B:
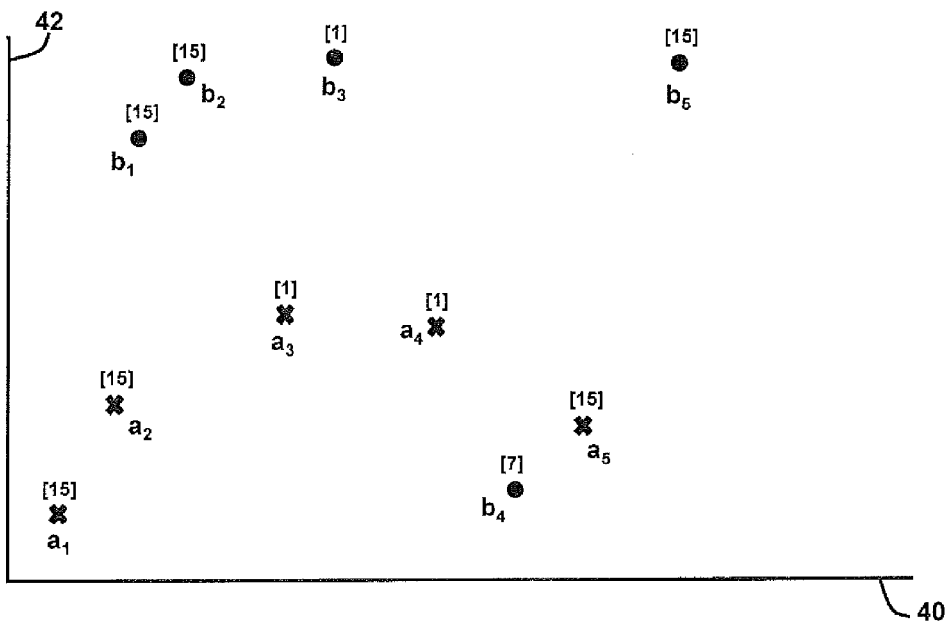
FIG. 8B is an x-y graph showing the particles of the first and second models in their new positions and the respective redistributed weight values assigned to the particles.

FIG. 8B is an x-y graph showing the new positions of the particles $a_1$ to $a_5$ of the first model 26, the new positions of the particles $b_1$ to $b_5$ of the second model 28, and the respective redistributed weight values assigned to the particles $a_1$ to $a_5$ and $b_1$ to $b_5$ at step s10. The respective redistributed weights are shown in square brackets [ ] adjacent to the particle to which the weight value is assigned.

Figure 8C:
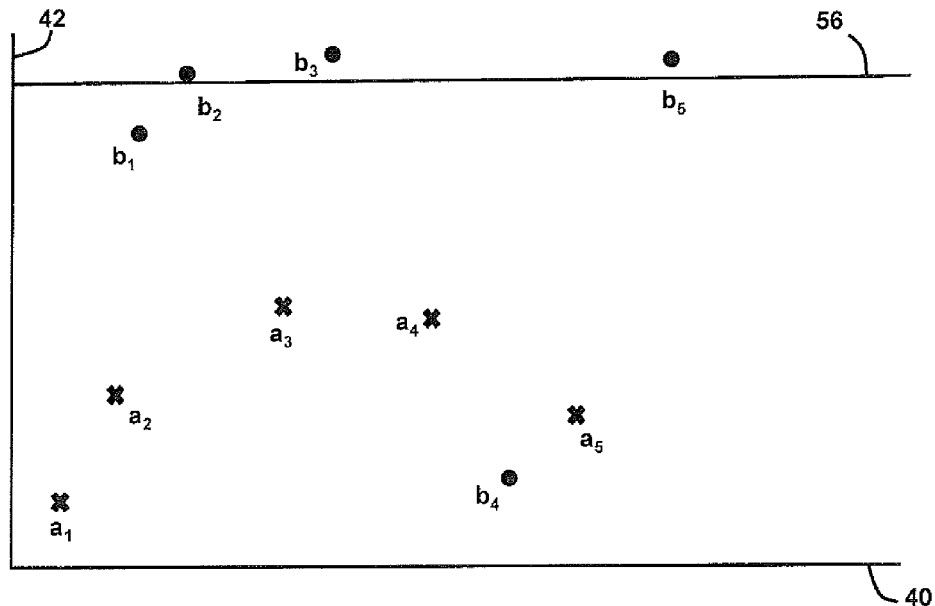
FIG. 8C is an x-y graph showing the particles of the first and second models, and a further observation value.

At step s46, a further observation is made of the target by the mine-hunting vessel 2. The mine-hunting vessel 2 measures a further specific value of the observation parameter. FIG. 8C is an x-y graph showing particles $a_1$ to $a_5$ of the first model 26, particles $b_1$ to $b_5$ of the second model 28, and a further observation value 56. The further observation value 56 is shown in FIG. 8C as a line with a constant observation parameter value across all possible angles. This is because it is unknown at which angle relative to the models 26, 28 the mine-hunting vessel 2 is observing the target.

At step s48, the present weights assigned to the particles $a_1$ to $a_5$ and $b_1$ to $b_5$ are redistributed. In this example, the present weights are redistributed depending on the Euclidean distance between the particle and the further observation value line 56. The initial weights are redistributed such that the weights of particles on or near the further observation value line 56 is increased and the weights of particles not near the further observation value line 56 is decreased. In this example the present weights are redistributed using the same methodology as the redistribution of the initial weights in step s10, as described above with reference to FIG. 3. In this example, the sum of the weight values of all the particles is kept constant, i.e. equal to one hundred.

Figure 8D:
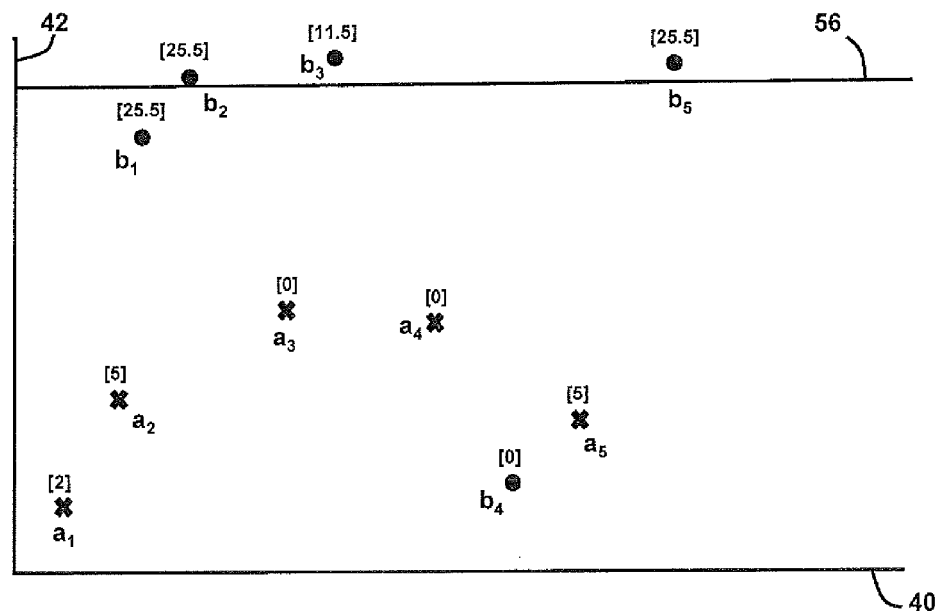
FIG. 8D is an x-y graph showing the particles of the first and second models, the further observation value, and the respective redistributed weight values assigned to the particles.

FIG. 8D is an x-y graph showing particles $a_1$ to $a_5$ of the first model 26, particles $b_1$ to $b_5$ of the second model 28, the further observation value line 56, and the respective redistributed weight values assigned to the particles $a_1$ to $a_5$ and $b_1$ to $b_5$ at step s16. The respective redistributed weights are shown in square brackets [ ] adjacent to the particle to which the weight value is assigned.

The redistributed weight values at step s42 are shown below in Table 5. In this example the sum of the weights of all the particles is kept constant, i.e. the sum of the weights of all the particles equals one hundred, as described above with reference to FIG. 4C.

TABLE 5

| first model 26 | | second model 28 | |
|---|---|---|---|
| particle | weight | particle | weight |
| $a_1$ | 2 | $b_1$ | 25.5 |
| $a_2$ | 5 | $b_2$ | 25.5 |
| $a_3$ | 0 | $b_3$ | 11.5 |
| $a_4$ | 0 | $b_4$ | 0 |
| $a_5$ | 5 | $b_5$ | 25.5 |
| sum | 12 | sum | 88 |

At step s50, the weights of the particles $a_1$ to $a_5$ of the first model 26 are summed. Also the weights of the particles $b_1$ to $b_5$ of the second model 28 are summed. In this example the sum of the weights of the particles $a_1$ to $a_5$ of the first model 26 equals twelve. In this example the sum of the weights of the particles $b_1$ to $b_5$ of the second model 28 equals eighty-eight.

At step s52; the respective probabilities that the target is a mine according to the first model 26 or the second model 28 are determined. In this example the determined probabilities are presented to a user, for example, to be used in a decision making process. In this example, the determined probabilities are presented to a user as part of the mine classification 10 that is output from the particle filter 22 of the mine-classifier 4, as described above with reference to FIGS. 1 and 2.

In this example the respective probabilities are determined using the following formula:

$$P(\text{target is of type } A) = \frac{\text{sum of weights of model } A \text{ particles}}{\text{sum of all particle weights}}$$

In this example the probability that the target is a mine according to the first model 26 is equal to 0.12, and the probability that the target is a mine according to the second model 28 is equal to 0.88.

Figure 9:
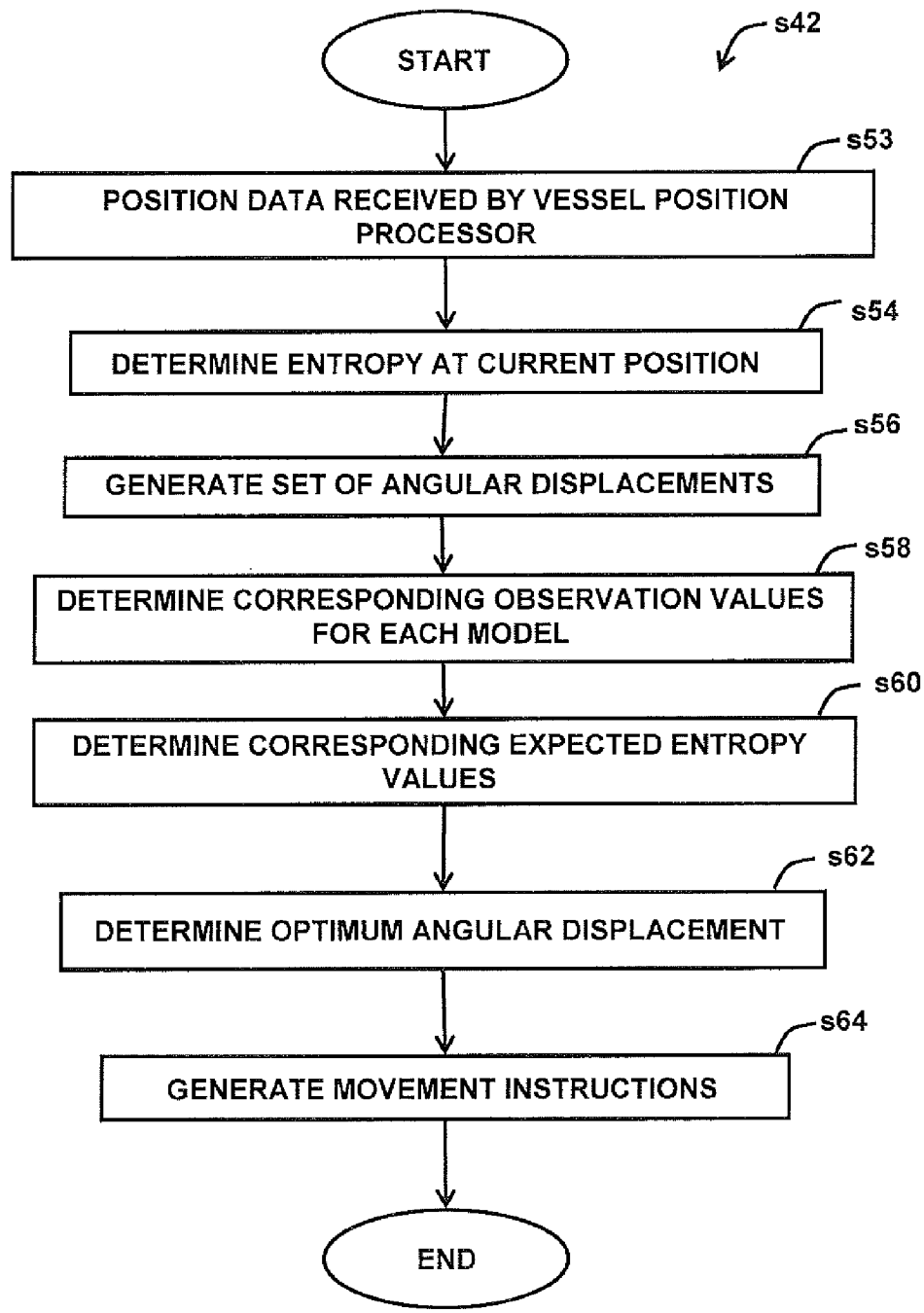
FIG. 9 is a process flowchart showing certain steps involved in an embodiment of a process of determining movement instructions using position data.

FIG. 9 is a process flowchart showing certain steps involved in the above mentioned process of step s42 of determining the movement instructions 14 using the received position data 12. The process of determining the movement instructions 14 described in FIG. 9 is a process of determining at which position a target should be viewed from in order to attempt to make an observation that best distinguishes between the first model 26 and the second model 28, and providing instructions to the mine-hunting vessel 2 to move to that position. In this embodiment, this process is one of minimising the uncertainty, or entropy, associated with the probability that the target is a particular model, given the possible models for the target, the set of observations of the target, and the angular displacement of the mine-hunting vessel 2. In this embodiment, the term entropy refers to Shannon entropy, which is known to the skilled person (see Shannon, C. E. "A Mathematical Theory of Communication" The Bell System Technical Journal 1948, 27, 379-423 and 623-656, which is incorporated herein by reference). The Shannon entropy is a measure of the average information content one is missing about the probability that the target is a particular model, given the possible models for the target, the set of observations of the target, and the angular displacement of the mine-hunting vessel 2. Thus, in this embodiment the terminology "entropy of the probability that the target is a particular model type", adopted hereinafter, represents an amount of information one is missing about the probability that the target is a particular model, given the possible model for the target, the set of observations of the target, and the angular displacement of the mine-hunting vessel 2. Equivalently, this terminology represents a measure of one's uncertainty associated with the probability that the target is a particular model, given the possible model for the target, the set of observations of the target, and the angular displacement of the mine-hunting vessel 2.

Referring to FIG. 9, at step s53 the position data 12 containing the probabilities determined at step s38, i.e. the probability that the target is a mine according to the first model 26 and the probability that the target is a mine according to the second model 28, is received by the vessel position processor 6, as described above with reference to FIGS. 1 and 2.

At step s54, the vessel position processor 6 determines the entropy of the probability that the target is a particular model type. The entropy of the probability that the target is a particular model type is dependent upon the current position of the mine-hunting vessel relative to the target, previously measured values of the observation parameter, and the models being considered for the target. In this embodiment, the entropy of the model type of the target is determined using the following formula:

$$H(R_l \mid \Delta\theta_t, O_t) = -\sum_{l=1}^{L} P(R_l \mid \Delta\theta_t, O_t) \log P(R_l \mid \Delta\theta_t, O_t)$$

Where: H(X) is entropy of the variable X;
$R_l$ is a model of type l=1, 2, ..., L;
P(X) is the probability of the variable X;
$\Delta\theta_t$ is the total angular displacement of the mine-hunting vessel 2 relative to its original position, i.e. the total angle around the target that the mine-hunting vessel 2 has moved in all previous time steps t=0,1, ..., t. In this embodiment, $\Delta\theta_t$ is between zero and three-hundred-and-sixty degrees; and
$O_t$ is the set of previously measured values of the observation parameter at the previous time steps t=0,1, ..., t.

In this example, L=2 since there are two models, i.e. $R_1$ corresponds to the first model 26 and $R_2$ corresponds to the second model 28. Also in this example only the first time-step has passed, i.e. t=0. Thus $\Delta\theta_t = \Delta\theta_0$ and $O_t = O_0$. In this example, $\Delta\theta_0 = 0$ since the mine-hunting vessel 2 has not moved relative to the target in the first time-step t=0. In this example, $O_0$ comprises the first observation value 44, denoted by $O_0$, measured of the target by the mine-hunting vessel 2 at step s8, as described above with reference to FIG. 3.

Thus, $P(R_l \mid \Delta\theta_0, O_0)$ where l=1, 2 correspond to the probabilities that form part of the position data 12, determined at step s38, as described above with reference to FIG. 7, i.e. $P(R_1 \mid \Delta\theta_0, O_0) = 0.47$ and $P(R_2 \mid \Delta\theta_0, O_0) = 0.53$.

Thus, in this example, the entropy of the probability that the target is a particular model type is determined as:

$$H(R_l \mid \Delta\theta_0, O_0) = -\sum_{l=1}^{2} P(R_l \mid \Delta\theta_0, O_0) \log P(R_l \mid \Delta\theta_0, O_0)$$
$$= -((0.47 * \log(0.47)) + (0.53 * \log(0.53)))$$
$$= 0.69$$

The following steps s56-s62 describe a novel use of a Monte Carlo method for determining the optimum angular displacement 54.

At step s56, a set of possible values for the next time-step of above described parameter $\Delta\theta_t$, i.e. a set of possible values for $\Delta\theta_t$, is generated. This set of values for the parameter $\Delta\theta_l$ is a set of angles by which the mine-hunting vessel could move in the next time-step, t=1. In this example, the set of values of the parameter $\Delta\theta_l$ is generated as follows. An angle of a 360° circle is picked randomly. Each angle of the 360° circle has an equal probability of being picked. This picked angle is stored. This process of randomly picking and storing an angle from a 360° circle is repeated two-hundred-and-fifty times. Thus, a set of two-hundred-and-fifty uniformly random values of the parameter $\Delta\theta_l$, i.e. two-hundred-and-fifty uniformly random numbers between zero and three-hundred-and-sixty, is generated. The two-hundred-and-fifty uniformly random values of the parameter $\Delta\theta_l$ are hereinafter denoted as $\Delta\theta_{1,i}$ for i=1, ..., 250.

At step s58, the two-hundred-and-fifty random values of the parameter $\Delta\theta_1$ are used to determine two-hundred and fifty values of the observation parameter for each of the first and second models 26, 28. In other words, the values $\Delta\theta_{1,i}$ where i=1, ..., 250 are used to determine values $O_{l,i}$ for each of the first and second models 28. As described above, FIG. 4A is an x-y graph showing the first model 26 and the second model 28 on common axes. The x-axis 40 is the angle from which the target or mine is observed by the mine-hunting vessel 2 (i.e. the measurement variable). Thus, each of the two-hundred-and-fifty random angle values $\Delta\theta_{1,i}$ corresponds to a point on the x-axis of FIG. 4A. The y-axis 42 of FIG. 4A is the value of the observation parameter measured by the mine-hunting vessel 2 when observing the target or mine. Also, the mine models 26, 28 are represented by lines on the x-y graph that indicate the values of the observation parameter that is detected when a mine of that type is observed from a particular angle by the mine-hunting vessel 2. Thus, each of the two-hundred-and-fifty random angle values $\Delta\theta_{1,i}$ determine a value of the observation parameter that is detected when a mine, according to either the first model 26 or second model 28, is observed by the mine-hunting vessel 2 from a position reached by the mine-hunting vessel 2 after moving through the respective particular random angle. The two-hundred-and-fifty determined values $O_{l,i}$ for the first model 26, and the two-hundred-and-fifty determined values $O_{l,i}$ for the second model 28, are stored.

At step s60, an expected entropy of the probability that the target is a particular model type for each of the two-hundred-and-fifty possible next time-step movement angles, $\Delta\theta_{l,t}$, is determined and stored. The general formula for the expected entropy of the probability that the target is a particular model type at a next time-step movement angle, $\Delta\theta_{t+1}$ is as follows:

$$g_{t+1}(\Delta\theta_{t+1}) = E_{O_{t+1} \mid O_t, \Delta\theta_t, \Delta\theta_{t+1}} (H(R_l \mid \Delta\theta_t, \Delta\theta_{t+1}, O_t, O_{t+1}))$$
$$= \sum_{l=1}^{L} H(R_l \mid \Delta\theta_t, \Delta\theta_{t+1}, O_t, O_{t+1}) \times$$
$$\frac{\sum_{l=1}^{L} P(O_t, O_{t+1} \mid \Delta\theta_t, \Delta\theta_{t+1}, R_l)}{\sum_{l=1}^{L} P(O_t \mid \Delta\theta_t, R_l)}$$

Where: $g_{t+1}$ is the expected entropy at the time-step t+1; and
E(X) denotes the expected value of X (thus $E_{O_{t+1} \mid O_t, \Delta\theta_t}(H)$ is the expected value of the entropy, H, at the observation at the time step t+1 given that the set of $O_t$, $\Delta\theta_t$ and $\Delta\theta_{t+1}$ are known).

Thus, in this example, the following two-hundred-and-fifty values for the expected entropy of the probability that the target is a particular model type are determined and stored.

$$g_{1,i}(\Delta\theta_{1,i}) = E_{O_{1,i} \mid O_0, \Delta\theta_0, \Delta\theta_{1,i}} H(R_l \mid \Delta\theta_0, \Delta\theta_{1,i}, O_0, O_{1,i})$$
$$= \sum_{l=1}^{2} H(R_l \mid \Delta\theta_0, \Delta\theta_{1,i}, O_0, O_{1,i}) \times$$
$$\frac{\sum_{l=1}^{L} P(O_0, O_{1,i} \mid \Delta\theta_0, \Delta\theta_{1,i}, R_l)}{\sum_{l=1}^{L} P(O_0 \mid \Delta\theta_0, R_l)}$$

for i = 1, ..., 250.

At step s62, optimum angular displacement 54 for the time-step t=1 is determined. The optimum angular displacement 54 is the angle that maximises the reduction in expected entropy of the probability that the target is a particular model type, when the mine-hunting vessel 2 is moved by that angle.

The optimum angular displacement 54, denoted by $\Delta\theta_{opt}$, is determined using the following formula:

$$\Delta\theta_{opt} = \underset{\Delta\theta}{\mathrm{argmax}}(H(R_l \mid \Delta\theta_t, O_t) - g_{t+1})$$

Thus, in this embodiment the optimum angular displacement 54 for the time-step t=1, denoted by $\Delta\theta_{1,opt}$, is determined using the following formula:

$$\Delta\theta_{1,opt} = \underset{\Delta\theta_{1,i}}{\mathrm{argmax}}(H(R_l \mid \Delta\theta_0, O_0) - g_{1+i})$$

At step s64, the vessel position processor 6 generates the movement instructions 14. The movement instructions 14 comprise the optimum angular displacement 54 determined at step s62 as described above.

The process then proceeds to step s43, as described above with reference to FIG. 7.

Thus, in addition to above described advantages for the mine-classification processes described above, the entropy minimisation process tends to converge to a classification result more quickly than performing the mine classification processes, and/or any other classification process or processes, without the entropy minimisation process.

In the above examples, the mine detection and classification system, and the above described processes, are used for the detection and/or the classification of underwater mines. However, in other examples, the system and processes are used to detect and/or classify other types of objects.

In the above embodiments, the mine detection and classification system comprises a mine-hunting vessel, a mine-classifier, and a vessel position processor. However, in other embodiments the mine detection and classification system comprises different modules, in a different or the same configuration, that provide the same or corresponding functionality as those described above.

In the above examples, the mine-classifier comprises a mine model store, a parameter store, an automatic target recognition plug-in and a particle filter module. However, in other examples the mine-classifier comprises different modules, in a different or the same configuration, that provide the same or corresponding functionality as those described above.

In the above embodiments, the mine-hunting vessel is an Autonomous Underwater Vehicle. However, in other embodiments the mine-hunting vessel is a different type of vehicle.

In the above embodiments, the mine-hunting vessel detects and/or determines classification probabilities and/or classifies an object as either a first model type or a second model type. However, in other embodiments the hunting vessel detects and/or classifies an object as one of a different number of model types, or as no model type.

Whilst the model set 30 comprises two models in the illustrated embodiment, the number of models in model set 30 is preferably greater such that accuracy and reliability of the detection and/or classification is enhanced. The actual number of models used, depends on the particular situation. If too few models are used, the object cannot be accurately identified. If too many models are used, the process becomes less efficient and the uncertainty of correct classification increases as the differences between models under consideration reduce. Ideally, the smallest number of models that still gives a good chance of identifying the object under consideration should be used.

A "no model" type or "none of the above" class can be realised by including an additional model in the model set 30. Without such an additional model, all objects are classified as one of the model types in the model set 30. The additional model may comprise a model wherein the average return response does not vary at all with observation parameter; alternatively the average return response could vary randomly with observation parameter. For example, in the sonar domain, an object having a response that varies randomly with observation angle may be classified as "none of the above".

In the above embodiments, a single mine-hunting vessel is used to detect and/or classify an object. However, in other embodiments a different number of mine hunting vessels are used.

In the above embodiments, the sensor is forward-looking sonar. However, in other embodiments, a different sensor is used.

In the above embodiments, the mine-hunting vessel comprises a single sensor. However, in other embodiments, the mine-hunting vessel comprises a different number of the same or different sensors.

In the above examples, at step s4 five particles are defined on each of the first and second models. However, in other examples a different number of particles is defined on the first model and/or a different number of particles is defined on the second model.

In the above examples, the particles defined on each of the first and second models are randomly distributed across the respective model. However, in other examples the particles are distributed across the respective model in a different manner, for example, the particles are distributed uniformly across the respective model.

In the above examples, at step s6 the initial weight values assigned to the particles are all equal. However, in other examples the weight values assigned to the particles are not all equal, for example, in other examples the initial weight values are distributed according to some prior knowledge that results in non-uniformly distributed initial weight values. Also, in other examples, the initial weight allocation step s6 is omitted and weights are assigned according to an observation.

In the above examples, the particle weights are reassigned in dependence upon the Euclidean distance between the particles and an observation line. However, in other examples the particle weights are reassigned according other criteria, for example depending on statistically determined error bounds assigned to the observation line. In other examples, no numerical weights are assigned to the particles, and the particles are retained or negated/ignored by the model depending on, for example, the Euclidean distance between the particles and an observation line.

In the above examples, the sum of all the particle weight values is kept constant. However, in other examples the sum of all the particle weight values is not kept constant. When the sum of all the particle weight values is kept constant the step of reassigning the particle weights is typically equivalent to redistributing the weights.

In the above examples, two or three observation measurements of the target are taken. However, in other examples a different number of observation measurements of the target are taken. In many applications a much larger number of observation measurements are taken, and the iterations described above are repeated accordingly, e.g. ten or more times, or one hundred or more times.

In the above examples, the target for the mine-hunting vessel is identified by a target identifying vessel. However, in other examples the target for the mine-hunting vessel is identified by different means, for example, by an operator or user of the mine hunting vessel, or by the mine hunting vessel itself. In other examples the mine-hunting vessel is provided with a list of targets, for example, a user specified list of targets.

In the above examples, the first mine model is made empirically, for example, by taking sonar sensor measurements of a replica mine of a first type. However, in other examples the first mine model is made using a different method, for example, using sonar simulation of a mine or sonar sensor measurements of a simulated mine.

In the above examples, the second mine model is made empirically, for example, by taking sonar sensor measurements of a replica mine of a second type. However, in other examples the second mine model is made using a different method, for example, using sonar simulation of a mine or sonar sensor measurements of a simulated mine.

In the above embodiments, the observation parameter is the amplitude of a returned sonar pulse. However, in other embodiments the observation parameter is a different parameter, for example the shadow length of a sonar signal, the shadow shape of a sonar signal, or the ratio of amplitude to shadow length of a returned sonar signal. In other embodiments, radar or visual measurements may be used instead of or in conjunction with sonar.

In the above embodiments, the mine-hunting vessel in moved relative to the target once or twice. However, in other embodiments the mine hunting vessel is moved a different number of times relative to the target.

In the above examples, a process of Sequential Importance Re-sampling is initiated at step s22, as described above with reference to FIG. 5. However, in other examples Sequential Importance Re-sampling processes are initiated at different steps instead of or in addition to the Sequential Importance Re-sampling initiated at step s22.

In the above examples, a process of Sequential Importance Re-sampling involves negating or ignoring particles with a weight value below a threshold value of five. However, in other examples a different threshold value is used. In other examples different criteria for negating or ignoring particles are used. Also, in other examples no particles are ignored or negated.

In the above examples, a process of Sequential Importance Re-sampling involves dividing particles in to a number of sub-particles, the number of sub-particles being equal to the weight value of the particle. However, in other examples the process of Sequential Importance Re-sampling involves dividing particles in to a number of sub-particles where the number of sub-particles dependent on different criteria.

In the above examples, a process of Sequential Importance Re-sampling involves dividing particles in to a number of sub-particles, each sub-particle being assigned a unit weight. However, in other examples all the sub-particles are assigned a weight value different to one. In other examples, the weights assigned to the sub-particles are not all equal.

In the above examples, the sub-particles are distributed such that they lie on the relevant model line, in the vicinity of the particle from which they were divided. However, in other examples the sub-particles are distributed in different ways, for example, the sub-particles are distributed such that they lie in the same position as the particle from which they were divided.

In the above embodiments, the mine-hunting vessel is moved so that observations of the target from different angles can be made. However, in other embodiments the mine-hunting vessel is not moved, for example, in other embodiments the target moves relative to the mine-hunting vessel, or a different mine-hunting vessel makes an observation from a different angle, or the mine-hunting vessel makes another observation from the same position with a differently configured sensor. Other embodiments involve a combination of the mine-hunting vessel moving and, for example, the target moving relative to the mine-hunting vessel and/or a different mine-hunting vessel making an observation from a different angle and/or or the mine-hunting vessel making another observation from the same position with a differently configured camera. Also, in other embodiments not related to mine-hunting, the measurement variable may be other than an angle, and the variation of the measurement variable will be according to the form of the measurement variable.

In the above embodiments, at step s42 the vessel position processor determines the movement instructions. However, in other embodiments the movement instructions are determined elsewhere, for example, externally from the vessel position processor.

In the above embodiments, at step s42 the vessel position processor determines the Shannon entropy associated with the probability that the target is a particular model type. However, in other embodiments the vessel position processor determines a different information parameter, for example, a different measure of one's uncertainty or a measure of one's certainty. For example, in other embodiments Fisher information, a pattern parameter, and/or a measure of the number of bits of information are used instead of or in conjunction with the Shannon entropy.

In the above embodiments, angular displacements of the mine-hunting vessel are used in the process of minimising the entropy associated with the probability that the target is a particular model type. However, in other embodiments, different parameters are used, for example, the absolute position of the mine-hunting vessel.

In the above embodiments, at step s42 the optimum angular displacement is determined by performing a process involving minimising the Shannon entropy associated with the probability that the target is a particular model type, the Shannon entropy being a measure of lack of information, i.e. a measure of uncertainty. However, in other embodiments the optimum angular displacement is determined by performing a process involving performing a different operation on the same or a different parameter, for example, in other embodiments the optimum angular displacement is determined by performing a process involving maximising one's information about the model type of the target. More generally, in other embodiments, other appropriate functions defining in effect a classification potential level may be employed, where the classification potential level is a relative expected level of: (i) the information or lack of information, for use in a process leading toward classification of the object as one of the models, that is to be obtained if a measurement of the observation parameter were taken of the object at a respective value of the measurement variable; and/or (ii) the certainty or uncertainty with which the object could be classified as one of the models if a measurement of the observation parameter were taken of the object at the respective value of the measurement variable. In such cases, determining for example a maximum of the classification potential level when the classification potential level is a relative expected level of information or certainty is equivalent to, or corresponds to, determining a minimum of the classification potential level when the classification potential level is a relative expected level of lack of information or a relative expected level of uncertainty.

In the above embodiments, at step s42 a Monte Carlo random sampling algorithm involving two-hundred-and-fifty random samples of a circle is performed. However, in other embodiments a different number of random samples are used. Also, in other embodiments the random sample is drawn from a different set of samples, for example a restricted set of angles to which the mine-hunting vessel is able to move.

In the above embodiments, the particular equations described above with reference to steps s54, s60, and s62 are used to determine the entropy, the expected entropy and the optimum angular displacement. However, in other embodiments different appropriate equations are used.

In the above embodiments, a process of minimising the entropy associated with the probability that the target is a particular model type is initiated at step s42. However, in other embodiments a process of minimising the entropy associated with the probability that the target is a particular model type is initiated at a different step. Also, in other embodiments one or more further processes of minimising the entropy associated with the probability that the target is a particular model type are initiated at the same or different steps, for example, in other embodiments a process of minimising the entropy associated with the probability that the target is a particular model type is initiated after each observation and classification of the target.

The above embodiments of the vessel position processor and methods of selecting a value or change in value of the measurement variable have been described in terms of being used with examples of the above described mine classifier 4 which is based on use of a particle filter. However, it will be appreciated that the above and other embodiments of the vessel position processor and methods of selecting a value or change in value of the measurement variable may be used with other types of classifier, e.g. classifiers that classify objects other than mines, and/or classifiers that do not make use of a particle filter.

The invention claimed is:

1. A method for selecting an optimal observation position for a mine-hunting vessel from which to observe an object to be classified, said method comprising:

Using a plurality of empirically derived models for the object to be classified, said models comprising observation parameters defined as observed physical quantities of said object as a function of a measurement variable representing an observer's angular position relative to said object, and each said model representing a different class of object, said observer being said mine-hunting vessel;

Selecting a plurality of observer angular positions from which to observe said object;

Determining a respective corresponding value of observation parameter for each selected observer angular position according to each model in said plurality of empirically derived models;

Determining a value of a probability function using said respective corresponding value of observation parameter for each said selected observer angular positions according to each said model, wherein said value of said probability function indicates a classification potential of said object;

Wherein said classification potential of said object is relative:

(i) information or lack of information, for use in a process leading toward classification of said object as one of said models, that is to be obtained if a measurement of the observation parameter were taken of the object at a respective observer angular position; and/or (ii) certainty or uncertainty with which the object could be classified as one of the models if the measurement of the observation parameter were taken of the object at the respective observer angular position; and Selecting an observation position for said mine hunting vessel from which to observe said object from said plurality of selected observer angular positions with a maximum said value of said probability function.

2. The method according to claim 1, further comprising receiving respective classification potential that each respective model corresponds to the object; and wherein determining the value of the function further comprises using the received respective classification potential.

3. The method according to claim 1, wherein the classification potential is an expected entropy value.

4. The method according to claim 3, wherein the expected entropy value is an expected Shannon entropy value.

5. The method according to claim 1, further comprising measuring a value of the observation parameter of the object to be classified at the selected value/change in value of the measurement variable.

6. The method according to claim 1, further comprising using a classifier in which an observation of the object to be classified is performed at the selected value/change in value of the measurement variable and in which the resulting observed observation parameter value is used in a process of providing respective classification potentials that each respective model corresponds to the object.

7. The method according to claim 6, further comprising using the provided respective classification potential in at least one further iteration of the method of selecting a value or change in value of the measurement variable to be used for an observation of an object to be classified, the method comprising:

receiving a plurality of models for the object defined in terms of an observation parameter as a function of the measurement variable;

selecting a plurality of values of the measurement variable or change in the measurement variable;

for each model, determining a respective corresponding value of the observation parameter for each of the selected values of the measurement variable/changes in the measurement variable;

for each selected value of the measurement variable/change in the measurement variable, determining a value of a second probability function using the determined values of the observation parameter corresponding to each of the models, wherein the second probability function provides that each determined value of the function is indicative of an expected classification potential; and selecting a value or change in value of the measurement variable for an observation of the object to be classified dependent upon the determined classification potential level values; wherein the classification potential is a relative expected level of:

(i) the information or lack of information, for use in a process leading toward classification of the object as one of the models, that is to be obtained if the measurement of the observation parameter were taken of the object at a respective value of the measurement variable; and/or (ii) the certainty or uncertainty with which the object could be classified as one of the models if the measurement of the observation parameter were taken of the object at the respective value of the measurement variable in which determining the value of the function further comprises using the provided respective classification potential.

8. The method according to claim 1 wherein classification of the object comprises using a particle filter used to weight particles on the plurality of models for the object.

9. The method according to claim 1, wherein the classification potential is calculated using the following formula: where:

$$g_{t+1}(\Delta\theta_{t+1}) = E_{O_{t+1}|O_t,\Delta\theta_t,\Delta\theta_{t+1}}(H(R_l|\Delta\theta_t,\Delta\theta_{t+1},O_t,O_{t+1}))$$

$$= \sum_{l=1}^{L} H(R_l|\Delta\theta_t,\Delta\theta_{t+1},O_t,O_{t+1}) \times \frac{\sum_{l=1}^{L} P(O_t,O_{t+1}|\Delta\theta_t,\Delta\theta_{t+1},R_l)}{\sum_{l=1}^{L} P(O_t|\Delta\theta_t,R_l)}$$

$g_{t+1}$ is the expected entropy at the time-step t+1;
E (X) denotes the expected value of X;
H(X) is entropy of the variable X;
$R_l$ is a model of type l=1, 2, ..., L;
P(X) is the probability of the variable X;
θ is the measurement variable;
$\Delta\theta_t$ is the total change in value of the measurement variable θ in all previous time steps t=0, 1, ..., t;
$O_{t+1}$ is the predicted measured value of the observation parameter at the time steps t+1; and
$O_t$ is the set of previously measured values of the observation parameter at the time steps t=0, 1, ..., t.

10. The method according to claim 1, wherein the selected value or change in value of the measurement variable for an observation of an object to be classified dependent upon the determined classification potential values is determined using the following formula:

$$\Delta\theta_{opt} = \arg_{\Delta\theta}\max(H(R_l|\Delta\theta_t,O_t)$$

where: $\Delta\theta_{opt}$ is the selected value or change in value of the measurement variable for an observation of an object to be classified;
$g_{t+1}$ is the expected entropy at the time-step t+1;
H(X) is entropy of the variable X;
$R_l$ is a model of type l=1, 2, ..., L;
θ is the measurement variable;
$\Delta\theta_t$ is the total change in value of the measurement variable θ in all previous time steps t=0, 1, ..., t; and
$O_t$ is the set of previously measured values of the observation parameter at the time steps t=0, 1, ..., t.

11. A non-transitory machine readable storage medium storing a computer program or at least one of a plurality of computer programs arranged such that when executed by a computer system at least one of the computer programs causes the computer system to operate in accordance with the method of claim 1.

12. An apparatus to perform a method of determining selection criteria of the measurement variable according to claim 1.

* * * * *